May 6, 1958 R. K. BOLE 2,833,431
ELECTRIC AND HYDRAULIC POWER AND CONTROL SYSTEM
Original Filed Sept. 1, 1950 24 Sheets-Sheet 1

INVENTOR
ROBERT K. BOLE
BY
ATTORNEYS

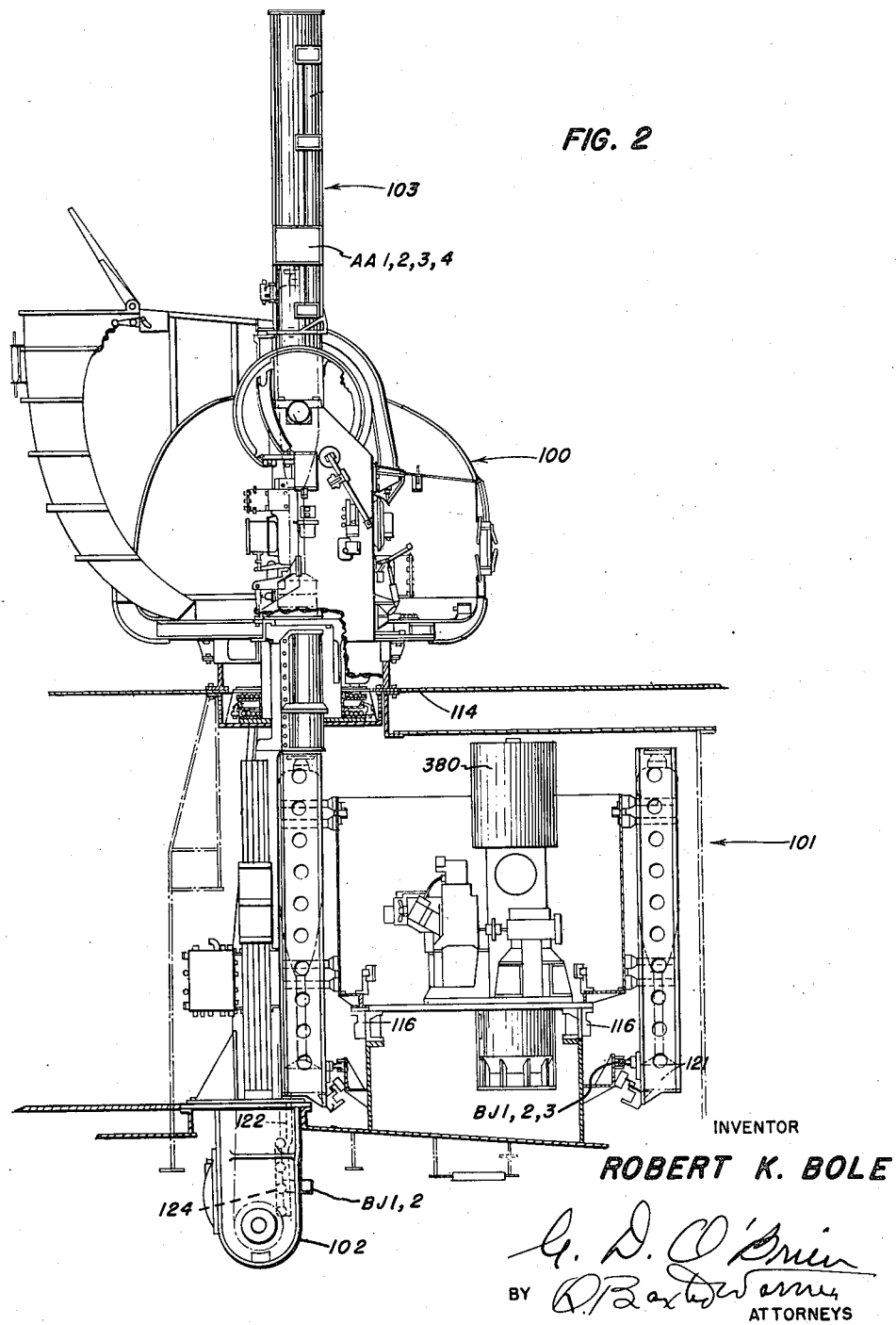

May 6, 1958 R. K. BOLE 2,833,431
ELECTRIC AND HYDRAULIC POWER AND CONTROL SYSTEM
Original Filed Sept. 1, 1950 24 Sheets-Sheet 3
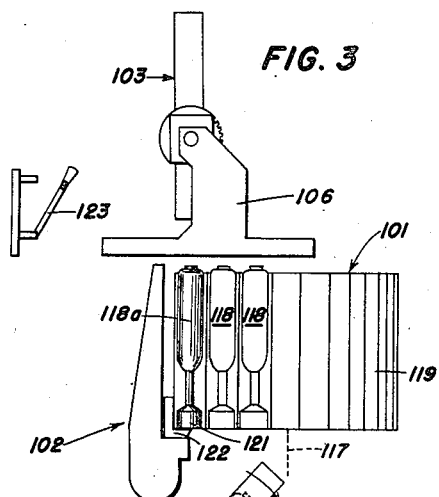
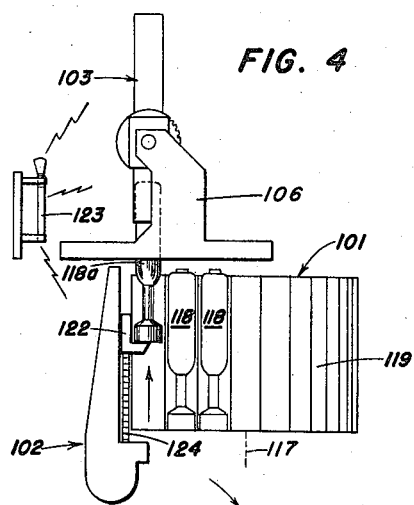
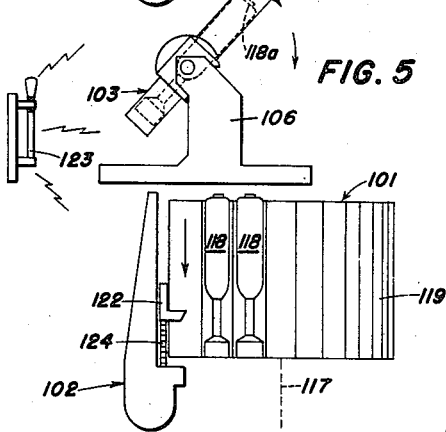
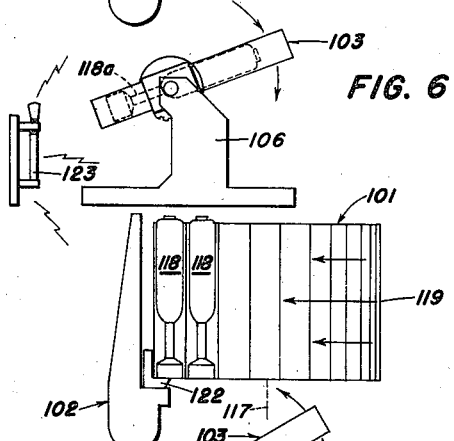
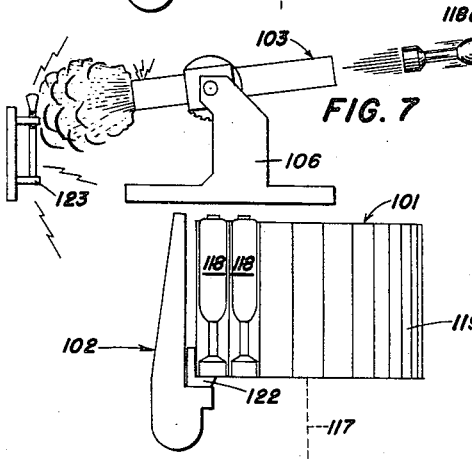
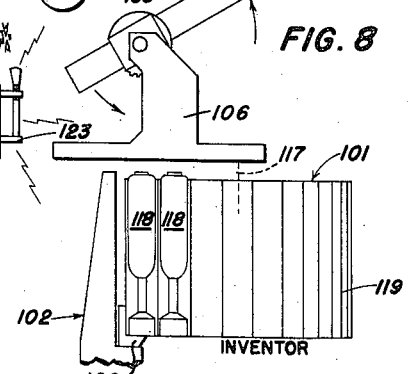
INVENTOR
ROBERT K. BOLE
BY
ATTORNEYS May 6, 1958 R. K. BOLE 2,833,431
ELECTRIC AND HYDRAULIC POWER AND CONTROL SYSTEM
Original Filed Sept. 1, 1950 24 Sheets-Sheet 4
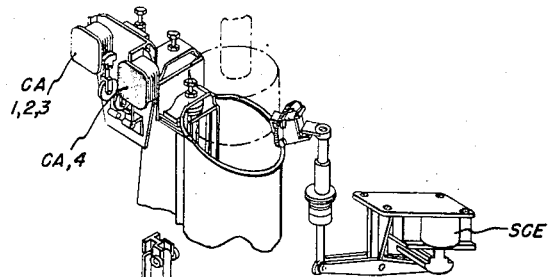
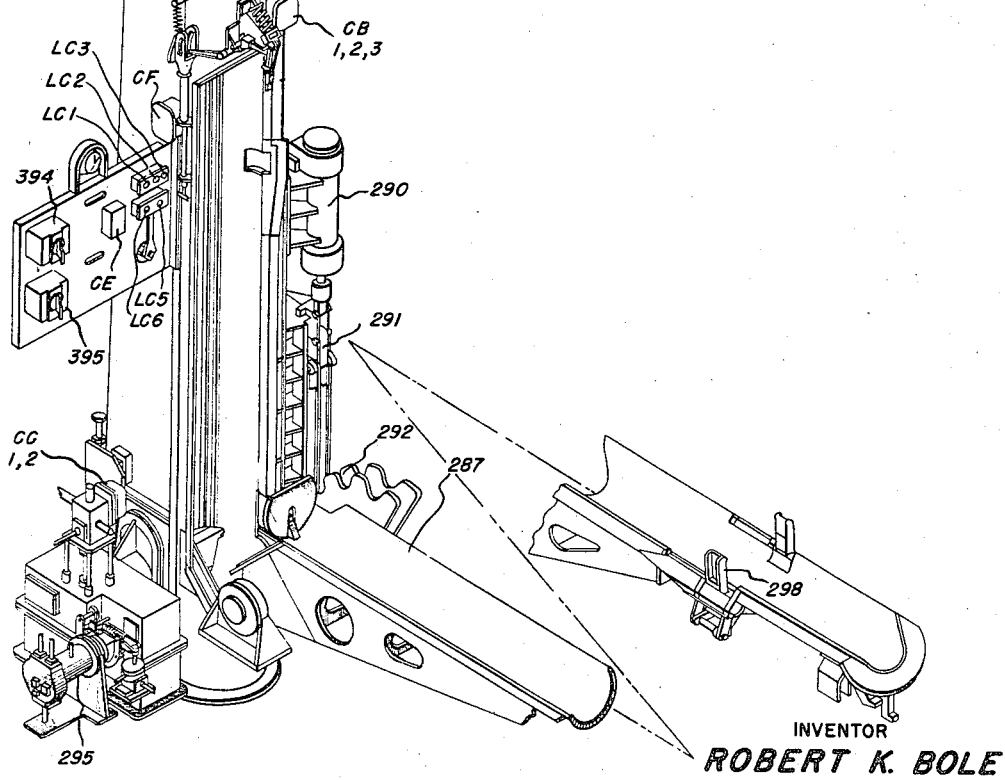
FIG. 9
INVENTOR
ROBERT K. BOLE

TIME CYCLE OF OPERATIONS

May 6, 1958 R. K. BOLE 2,833,431
ELECTRIC AND HYDRAULIC POWER AND CONTROL SYSTEM
Original Filed Sept. 1, 1950 24 Sheets-Sheet 6

INVENTOR
ROBERT K. BOLE
BY
ATTORNEYS

May 6, 1958 R. K. BOLE 2,833,431
ELECTRIC AND HYDRAULIC POWER AND CONTROL SYSTEM
Original Filed Sept. 1, 1950 24 Sheets-Sheet 17

INVENTOR
ROBERT K. BOLE
BY
ATTORNEYS

May 6, 1958 R. K. BOLE 2,833,431
ELECTRIC AND HYDRAULIC POWER AND CONTROL SYSTEM
Original Filed Sept. 1, 1950 24 Sheets-Sheet 19

INVENTOR
ROBERT K. BOLE

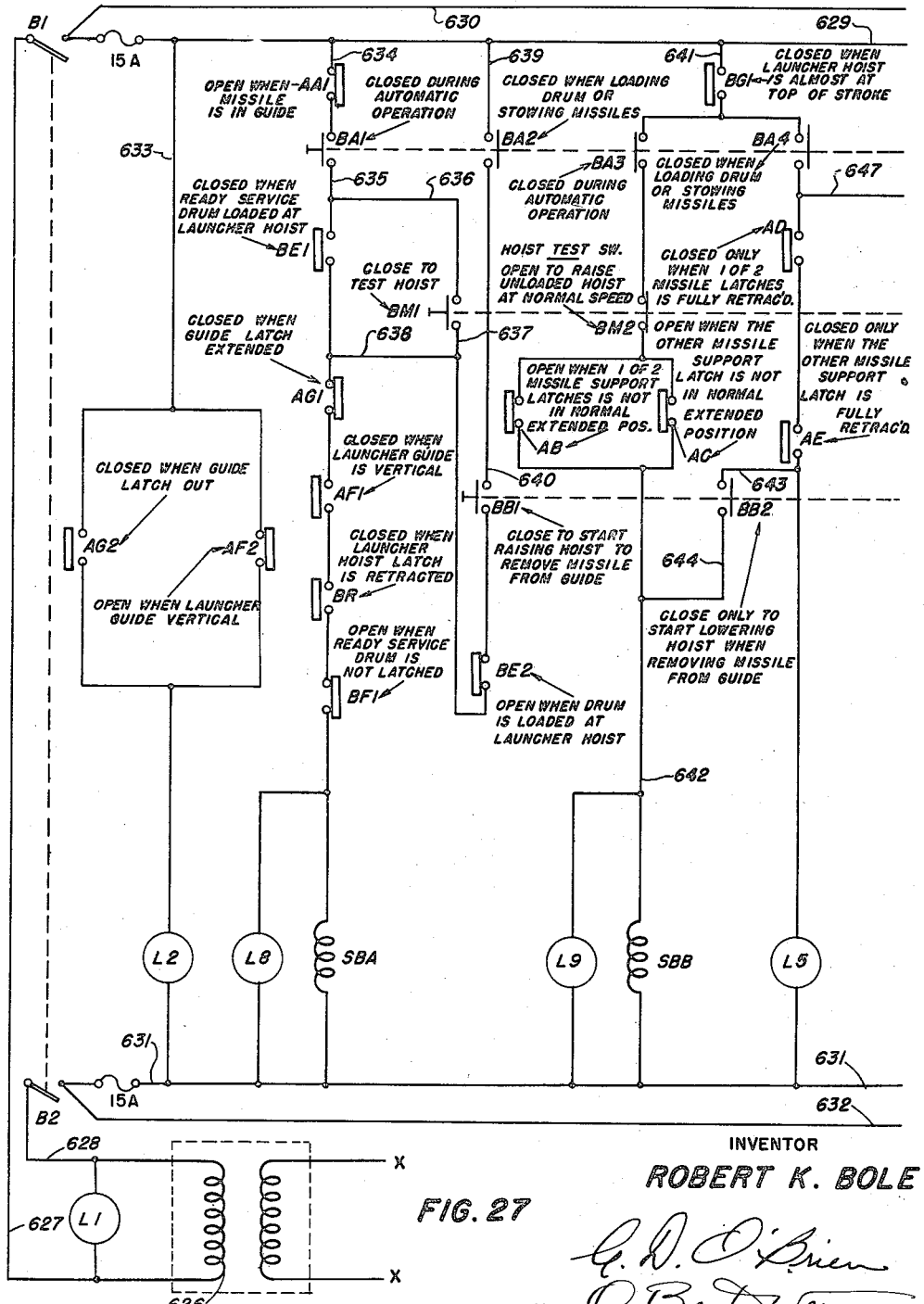

May 6, 1958 R. K. BOLE 2,833,431
ELECTRIC AND HYDRAULIC POWER AND CONTROL SYSTEM
Original Filed Sept. 1, 1950 24 Sheets-Sheet 22

INVENTOR
ROBERT K. BOLE

May 6, 1958 R. K. BOLE 2,833,431
ELECTRIC AND HYDRAULIC POWER AND CONTROL SYSTEM
Original Filed Sept. 1, 1950 24 Sheets-Sheet 23

INVENTOR
ROBERT K. BOLE
BY
ATTORNEYS

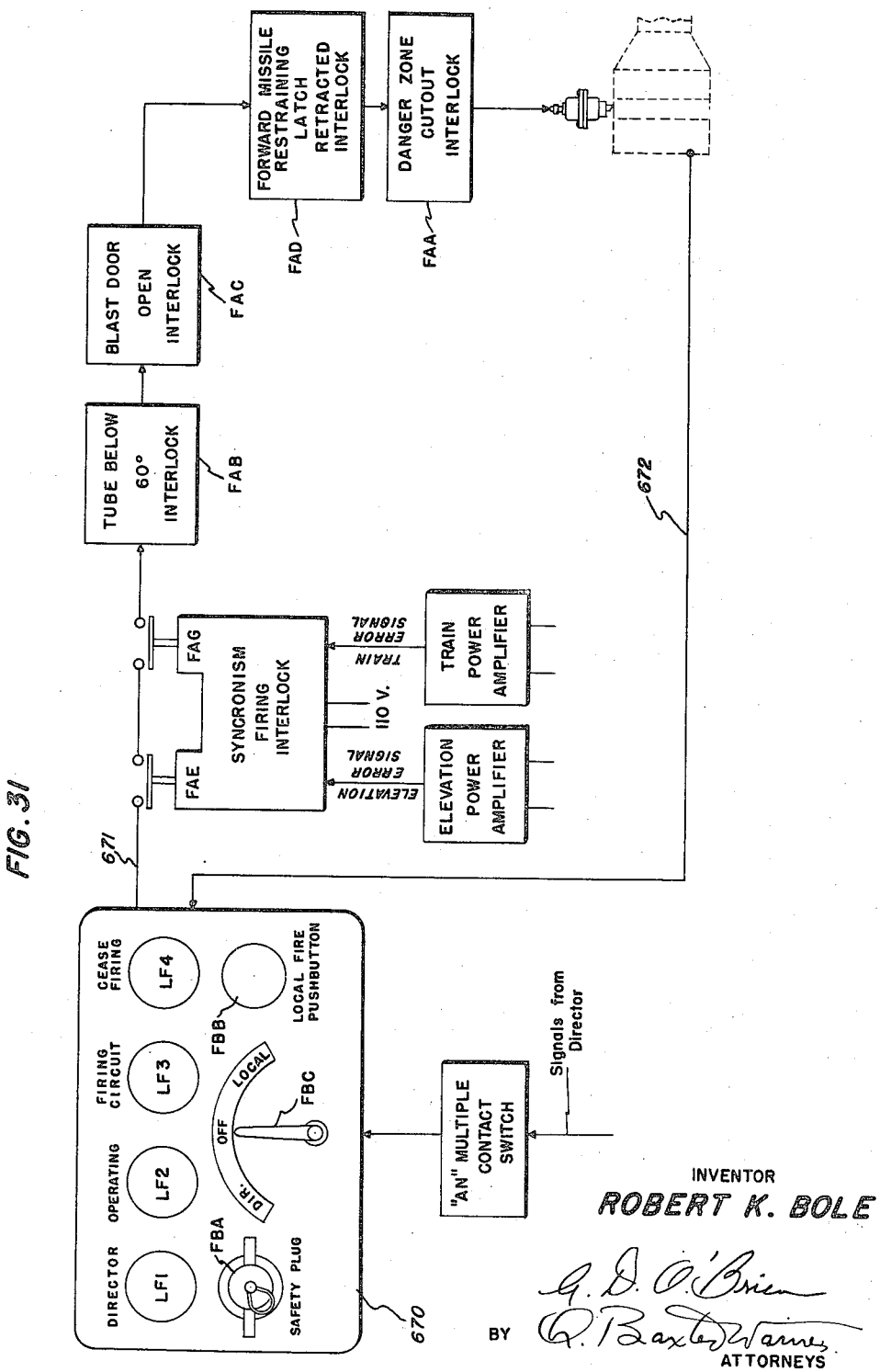

United States Patent Office 2,833,431
Patented May 6, 1958

2,833,431

ELECTRIC AND HYDRAULIC POWER AND CONTROL SYSTEM

Robert K. Bole, Bethesda, Md.

Original application September 1, 1950, Serial No. 182,696, now Patent No. 2,745,317, dated May 15, 1956. Divided and this application February 16, 1954, Serial No. 410,469

13 Claims. (Cl. 214—89)

(Granted under Title 35, U. S. Code (1952), sec. 266)

The invention described herein may be manufactured and used by or for the Government of the United States of America for governmental purposes without the payment of any royalties thereon or therefor.

This application is a division of application Serial No. 182,696, filed September 1, 1950, now Patent No. 2,745,317, for Missile Launcher, which is directed to a combination of several inventions by joint inventors Arthur J. Stanton, Robert E. Carlberg, Robert K. Bole, Frank W. Sieve, William Danziger, and Rocco De Masi.

This invention relates to missile launchers and more particularly to an electric-hydraulic system for enabling missile launchers to be automatically operated and which may be controlled from a remote firing station.

In the art of modern warfare the use of self-powered missiles such as rockets has been receiving increasing attention, however, difficulties have been encountered in the handling and launching of such missiles particularly when it is desired to launch a number of them in rapid succession.

Heretofore, devices for launching a multiplicity of rockets have been in the form of relatively simple construction comprising a rack or frame for supporting a number of rockets side by side and means for firing all of the rockets substantially simultaneously whereupon they are broadcast in the general direction of the target. When adapted for shipboard use such devices ordinarily could not independently be moved in train or elevation and their firing accuracy depended upon directing the ship toward the target and arriving at a prescribed range before the missiles were released. It will be apparent that to obtain repeated firing with such an arrangement it was necessary for the launcher to be loaded by hand from above-deck with exposed personnel and this loading step had to be repeated before the launcher could again be fired.

The risks attendant to the exposure of large numbers of rockets and personnel above-decks is readily apparent.

In order to avoid hazard to shipboard personnel loading rockets in an exposed position, there have been developed gravity fed or mechanically fed rocket launchers which fire rockets one by one through a firing trough, however, in such arrangements ordinarily the supply of rockets still must occupy an exposed position and hence is vulnerable to a hit by the enemy.

A further problem, particularly with large rockets, arises out of the tremendous heat generated by the rocket blast as it is fired. Because of the tremendous heat and blast effects of the rocket as it is launched, it is important that the launcher be automatically loaded and capable of being operated in train and in elevation by remote control means such as the conventional gun director employed aboard ship.

The electric-hydraulic system of the present invention when employed with a missile launcher of a suitable type enables the launcher to overcome the above and other limitations of prior art devices and is particularly adapted for use on naval vessels where space limitations are important, however, it will be understood that it is not limited to such use but may be used in other installations where a launcher of this character is desired.

A further object of the present invention is to provide an electric-hydraulic system of the character mentioned that may be completely automatic in operation and may be controlled from a remote station by conventional fire control equipment.

A further object is the provision of a power and control system for a ready service magazine and missile hoist by means of which missiles carried in the ready service magazines are sequentially moved into loading position and from there carried into the launcher guide by means of the hoist mechanism.

Another object is the provision of a hydraulic and electric power and control system for automatically indexing a rotatably mounted ready service drum or magazine in timed sequence with the up and down movements of a missile hoist whereby missiles carried in stalls about the periphery of the ready service drum are sequentially positioned in alignment with the missile hoist which conveys the missiles into the launcher guide positioned above the periphery of the ready service drum.

Still another object is the provision of an electric-hydraulic control system for an automatic missile launcher and having interlock means whereby sequential operation of the launcher parts is provided and whereby each part of the launcher operates in proper timed sequence so that launching can be effected.

Another object is the provision of electric-hydraulic control means for safely conveying an unfired missile from the launcher guide back to the missile magazine.

A further object is to provide electric-hydraulic control apparatus to facilitate the lowering of missiles from above-deck into a ship's stowage magazine.

A still further object is to provide hydraulic and electric power and control means for loading missiles from the ship's stowage magazine into a launcher ready service magazine.

Other objects and many of the attendant advantages of this invention will be readily appreciated as the same becomes better understood by reference to the following detailed description when considered in connection with the accompanying drawings wherein:

Fig. 2 is a similar view from the opposite side but with the parts of the launcher arranged in loading position;

Figure 1:
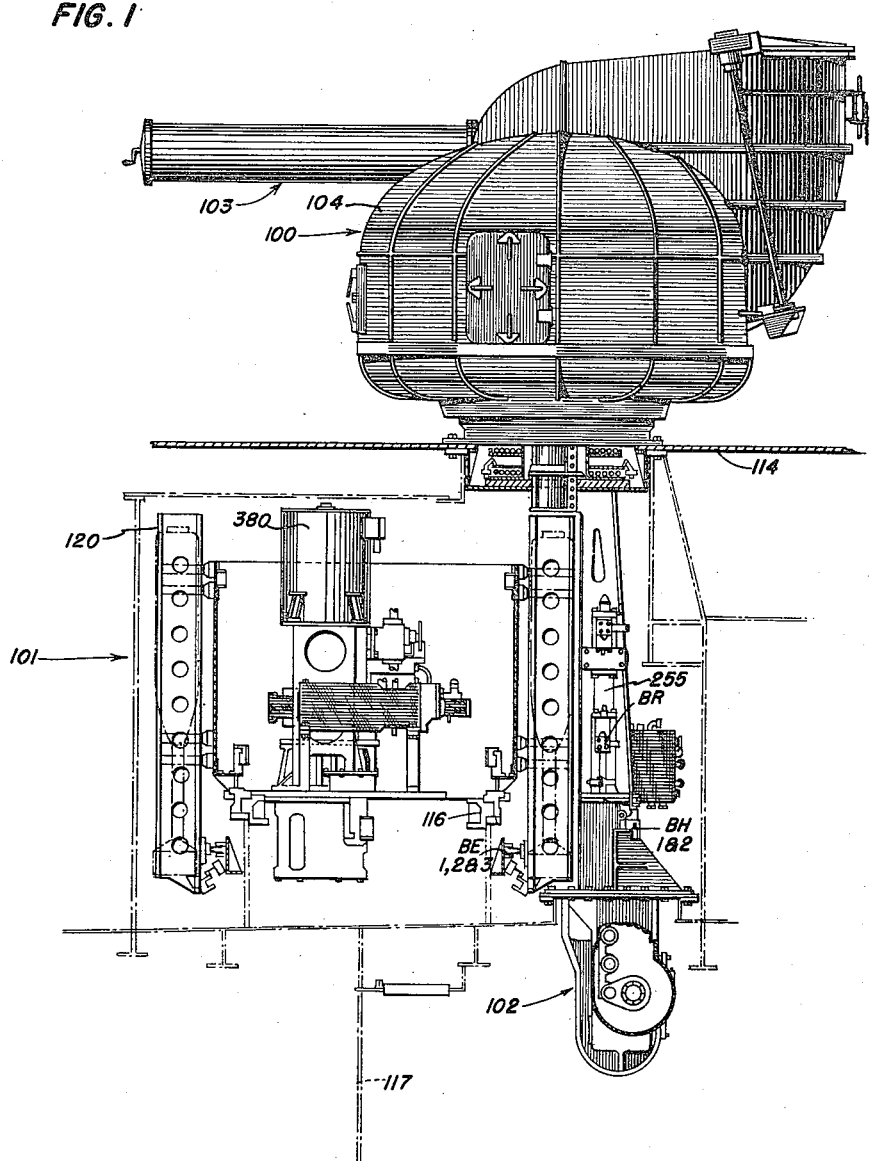
Fig. 1 is a vertical side elevation with portions removed showing some of the components of the present invention mounted on a launcher of the type with which the present invention is particularly well adapted for use.
Figure 10:
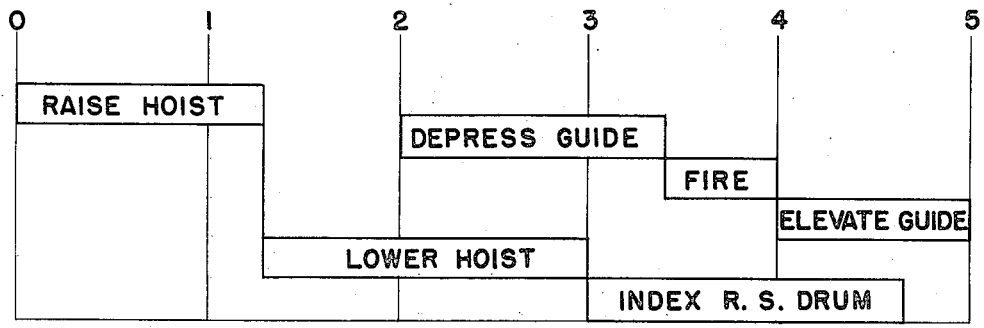
Figure 11:
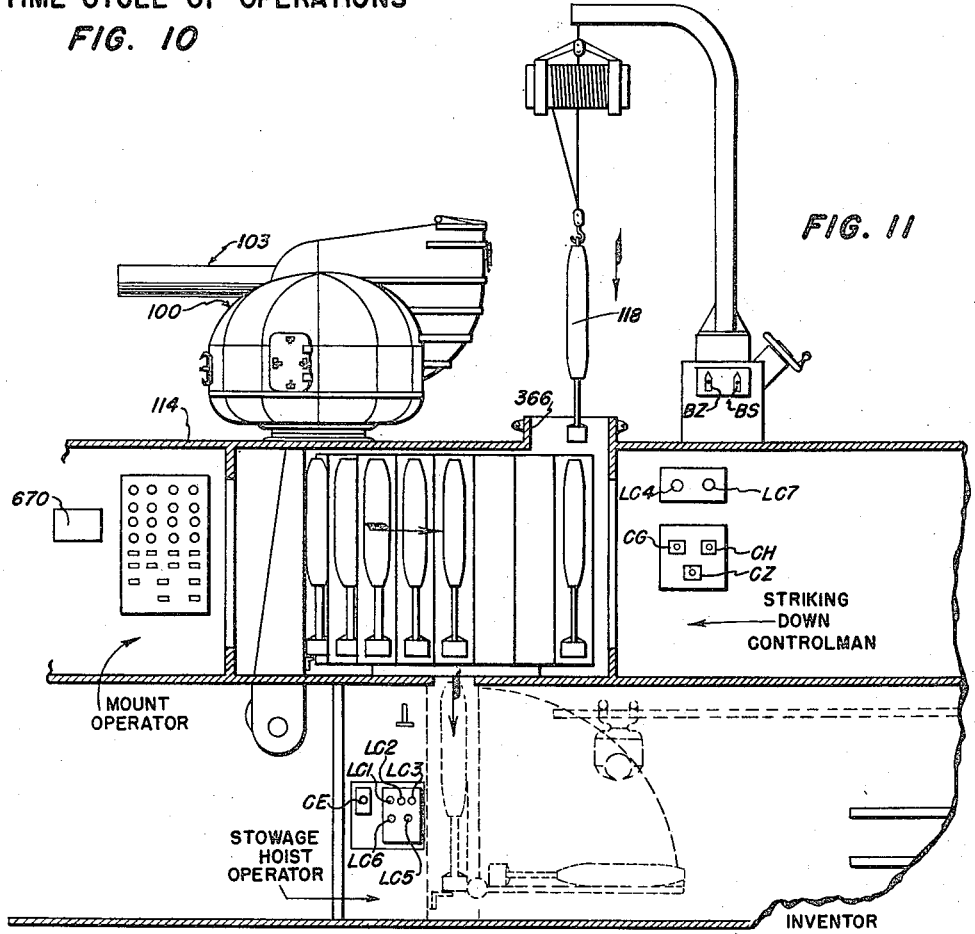
Figure 12:
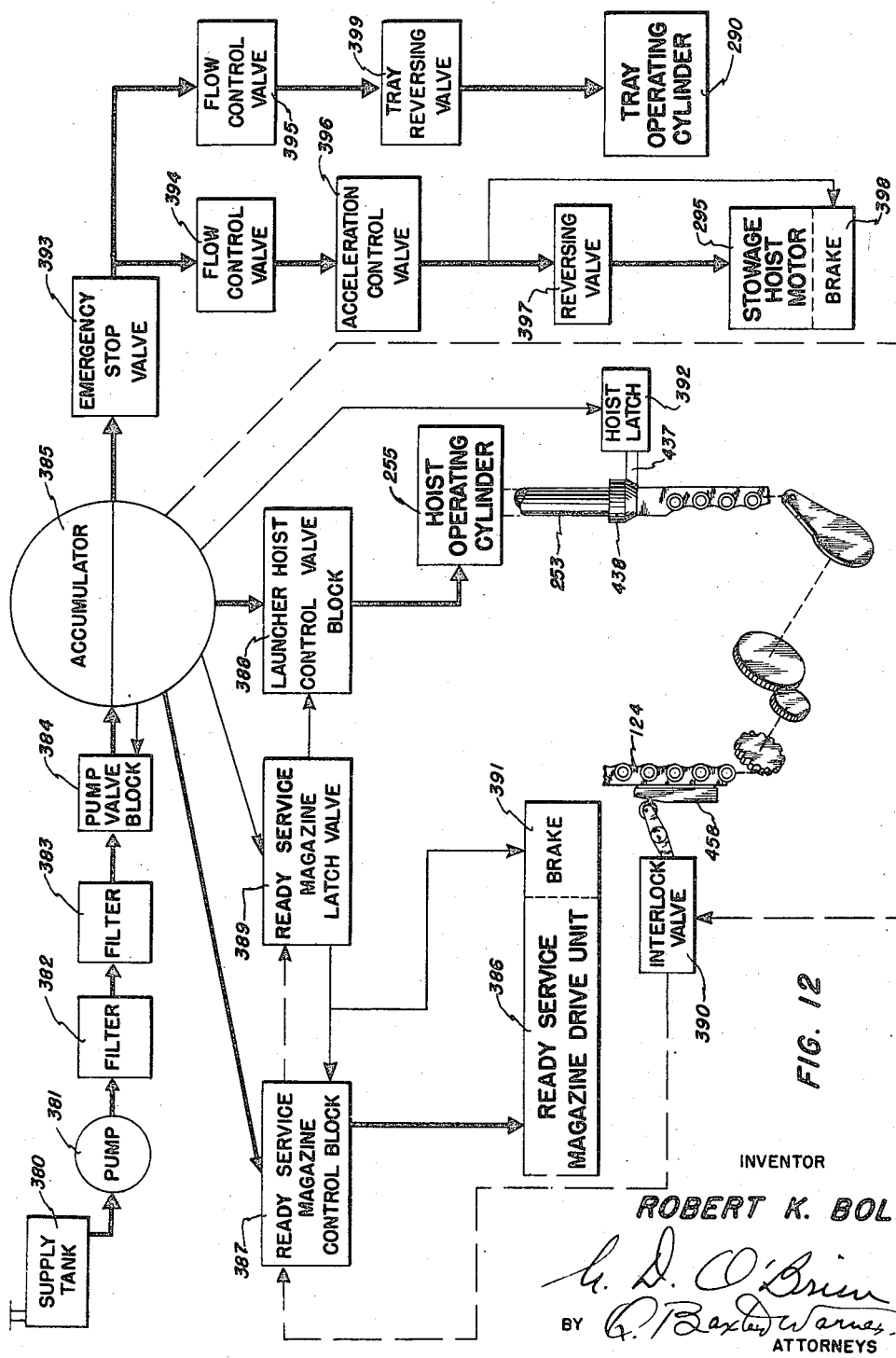
Figure 13:
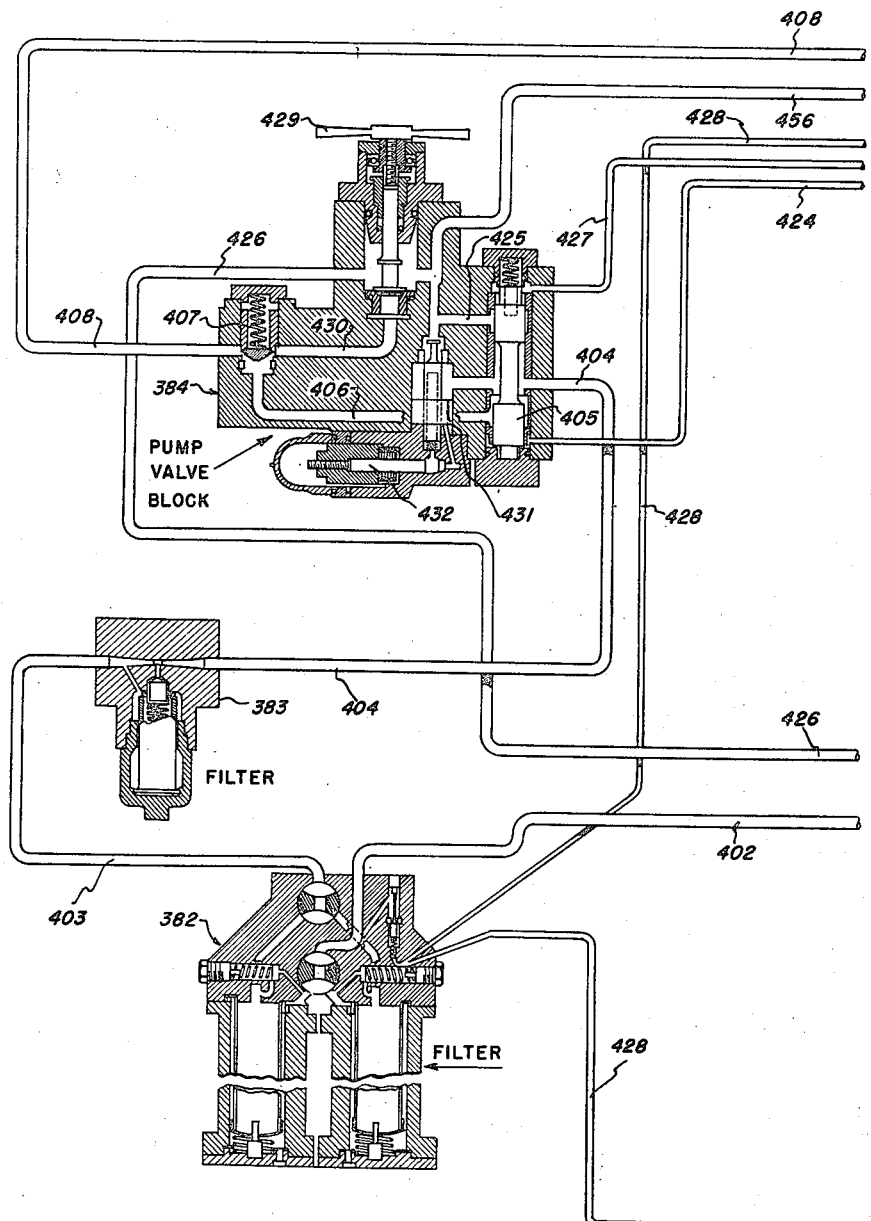
Figure 22:
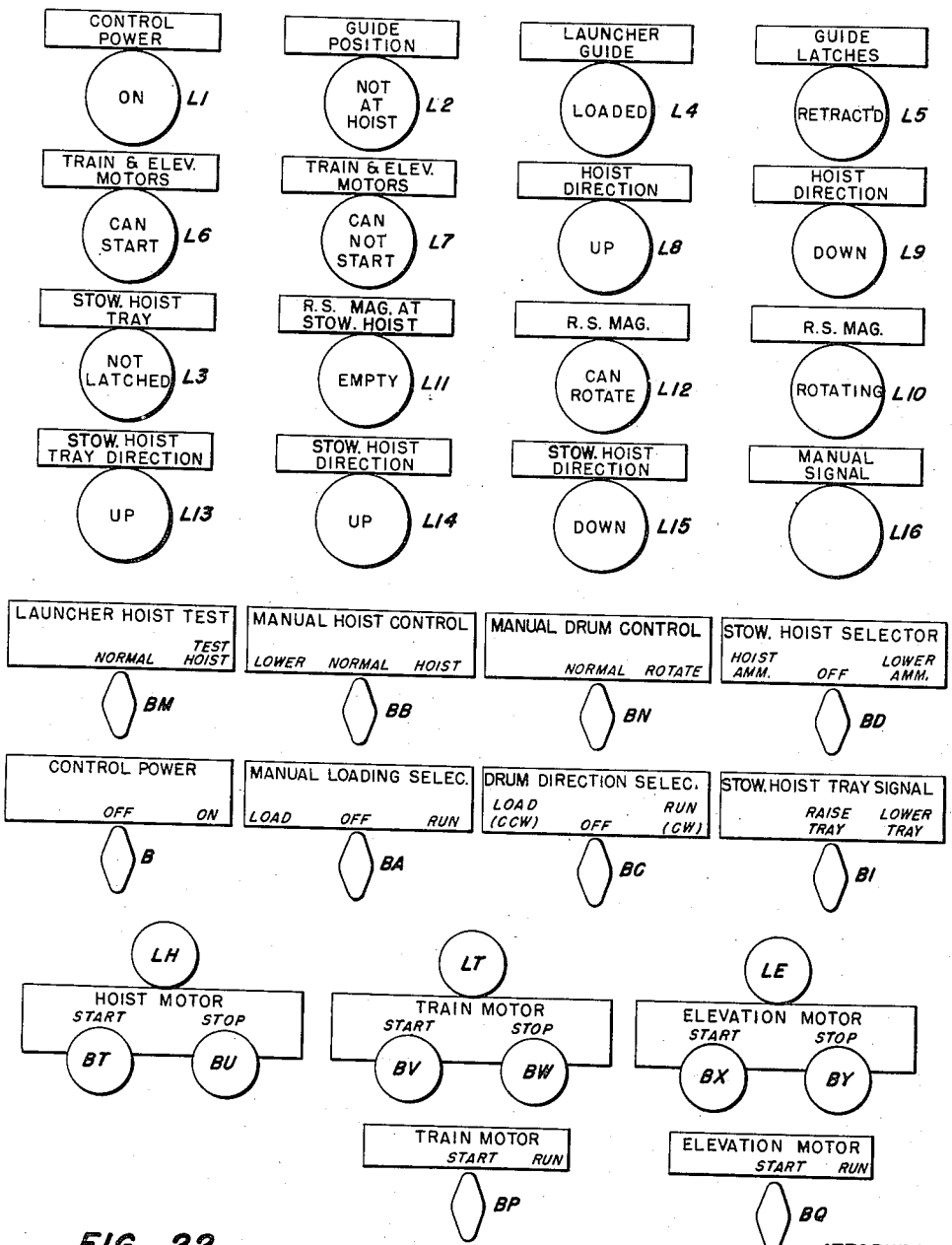
Figure 23:
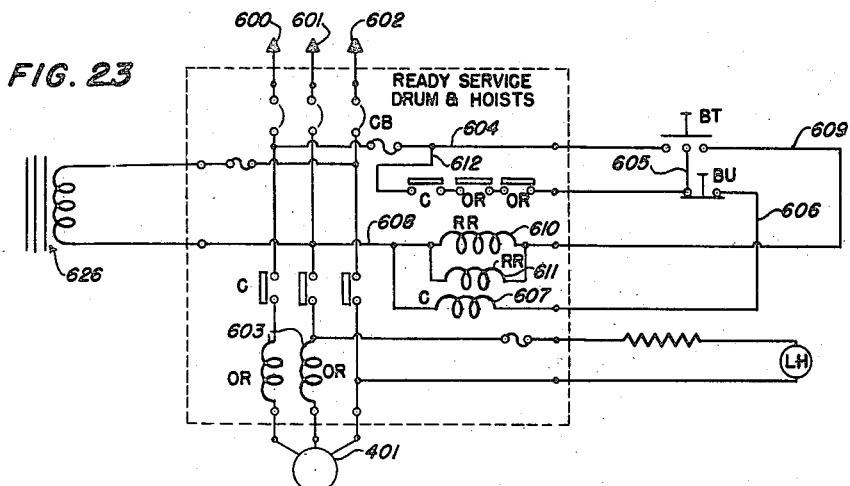
Figure 24:
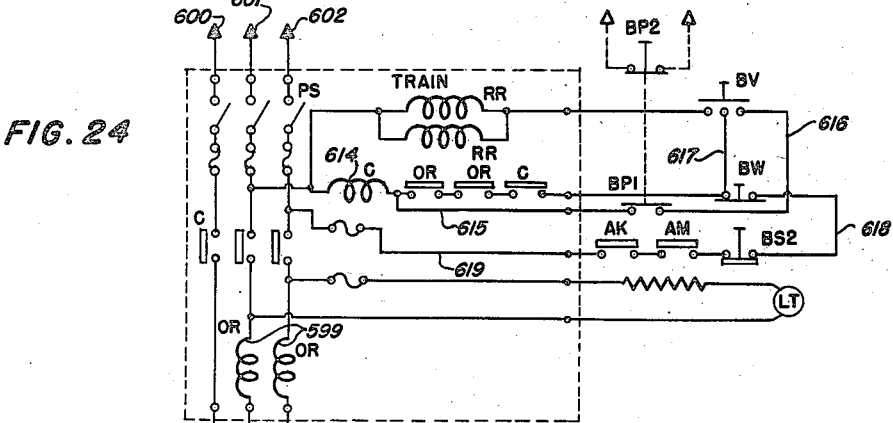
Figure 25:
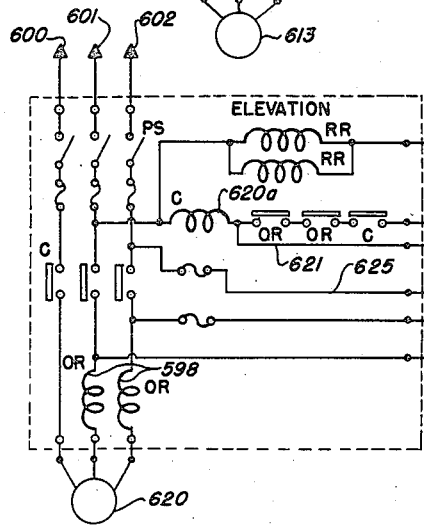
Figure 26:
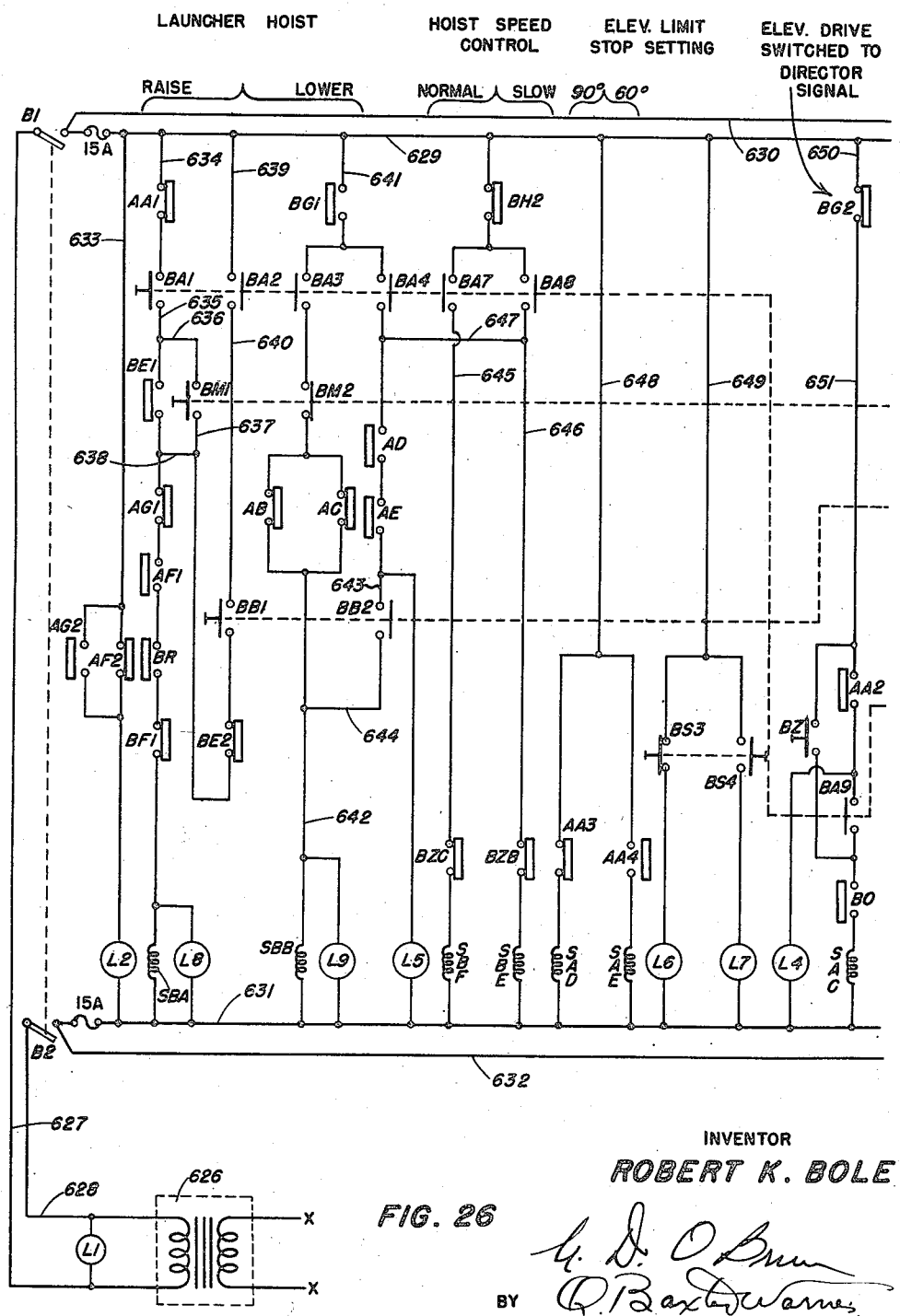
Figure 26A:
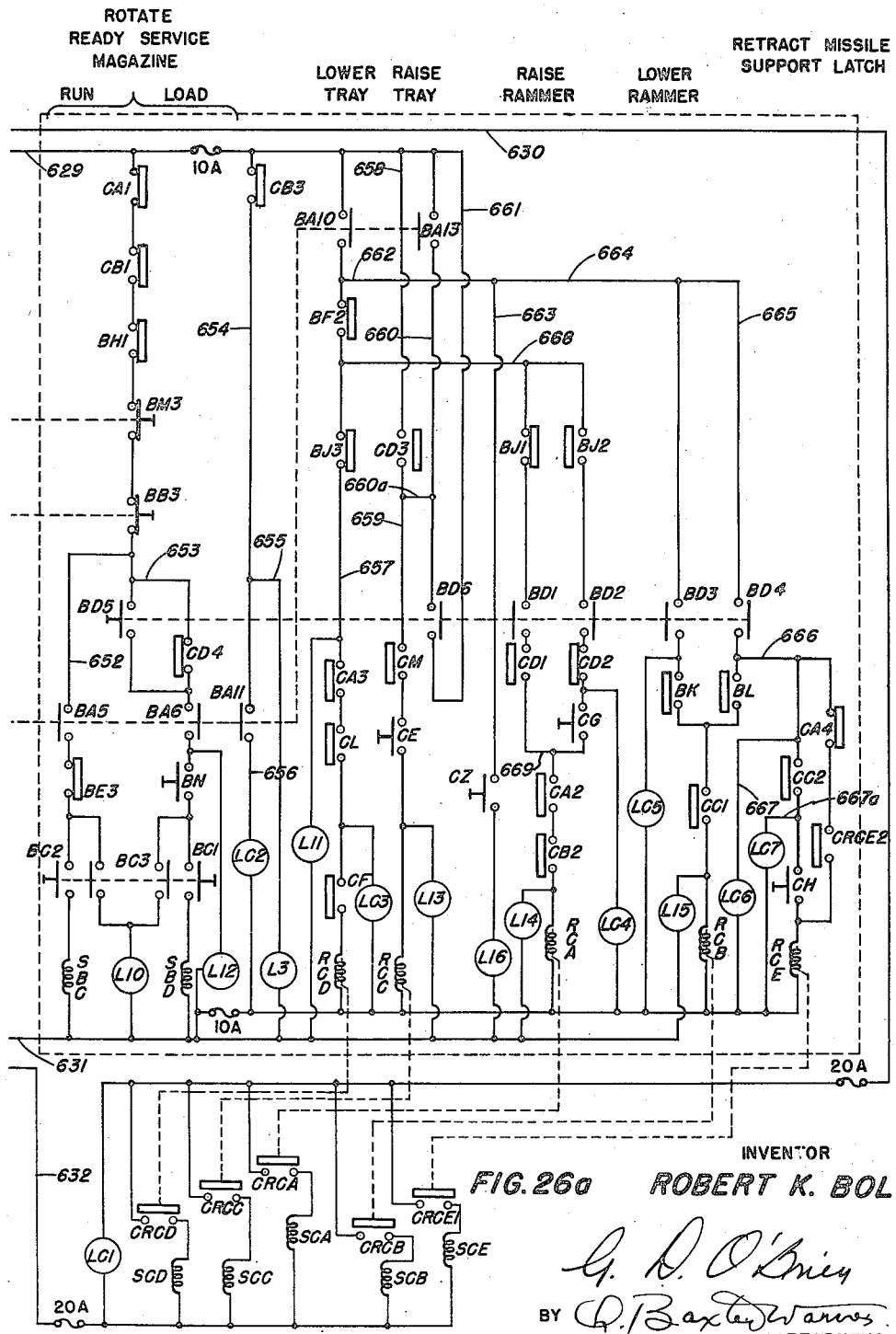
Figure 28:
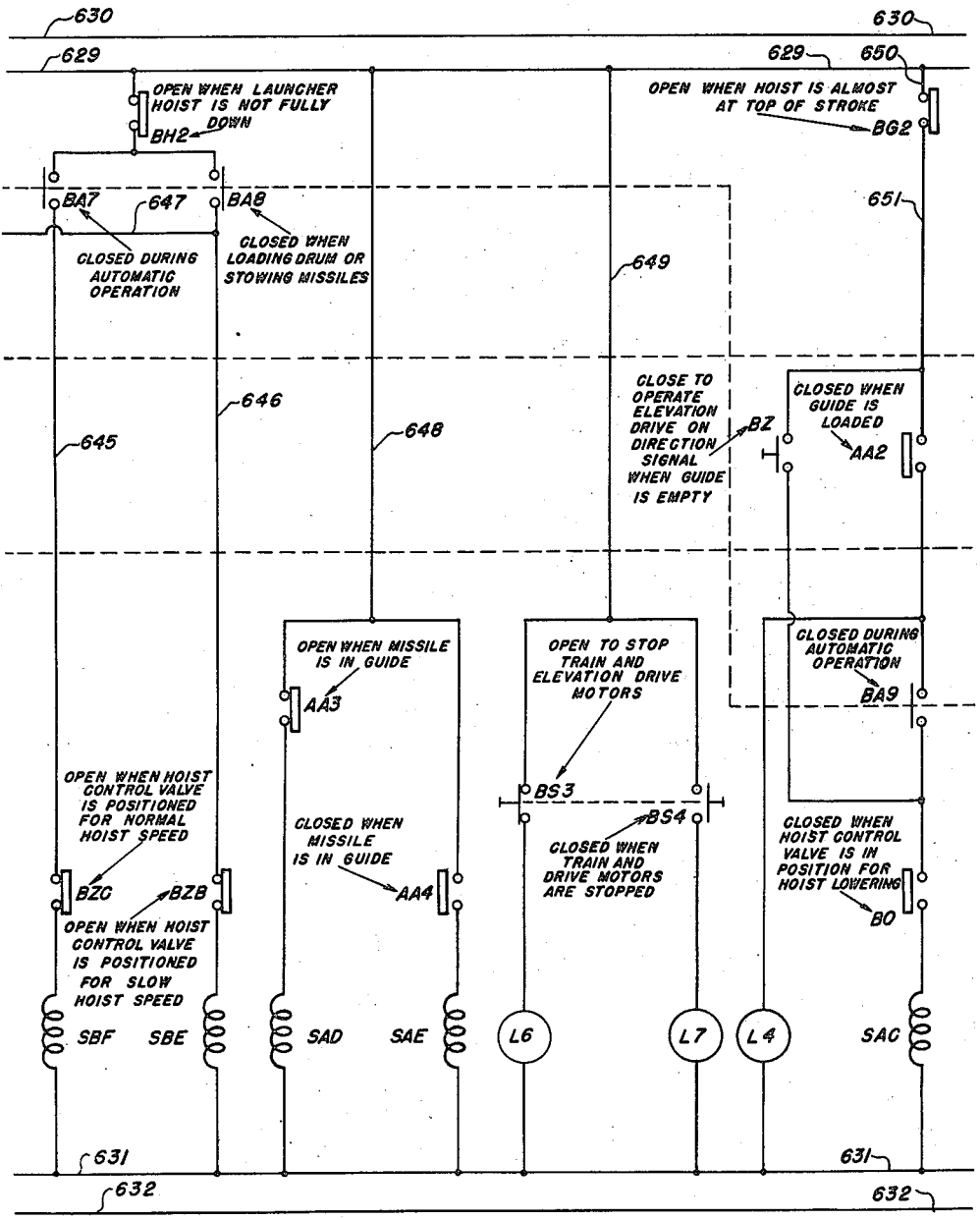
Figure 29:
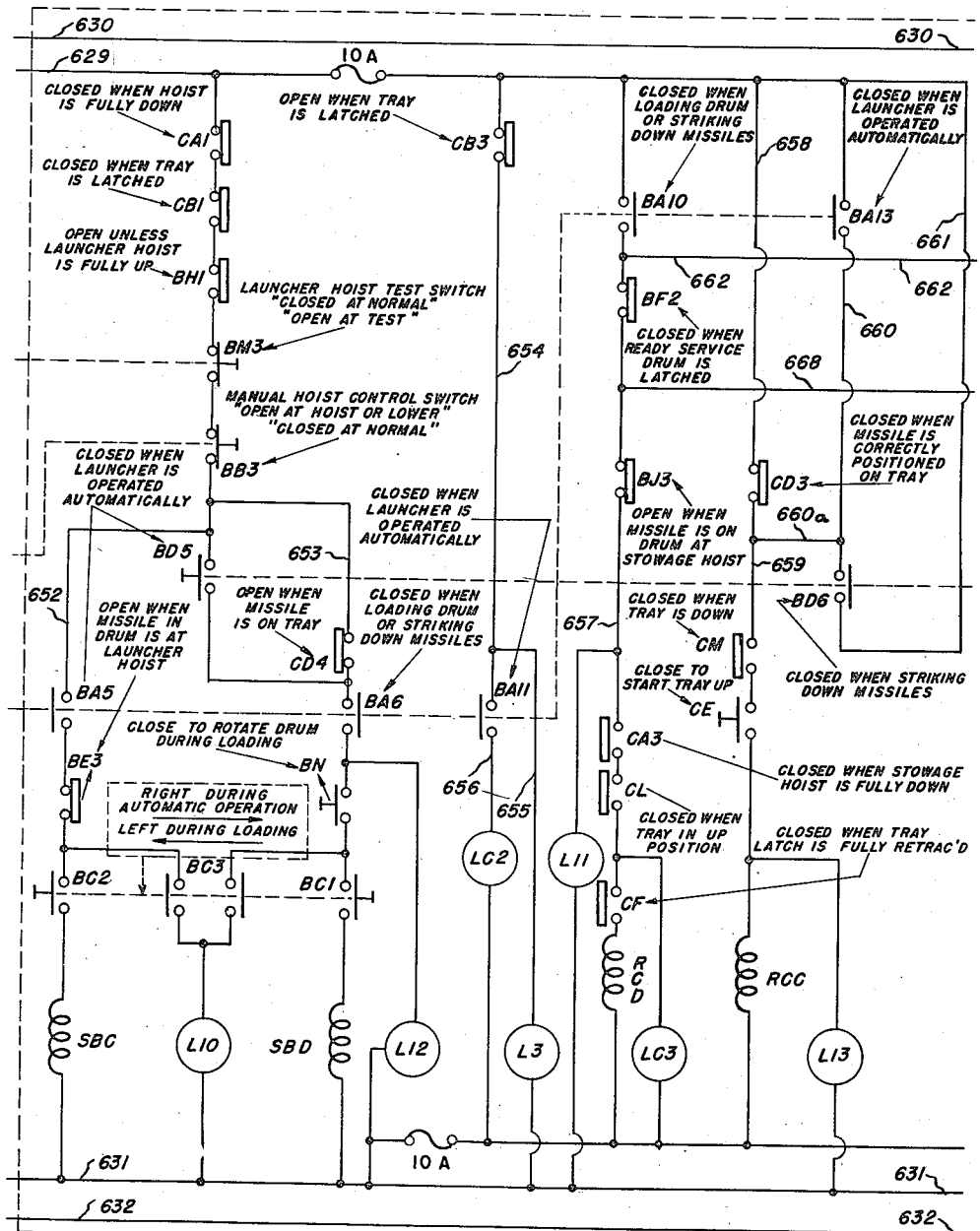
Figure 30:
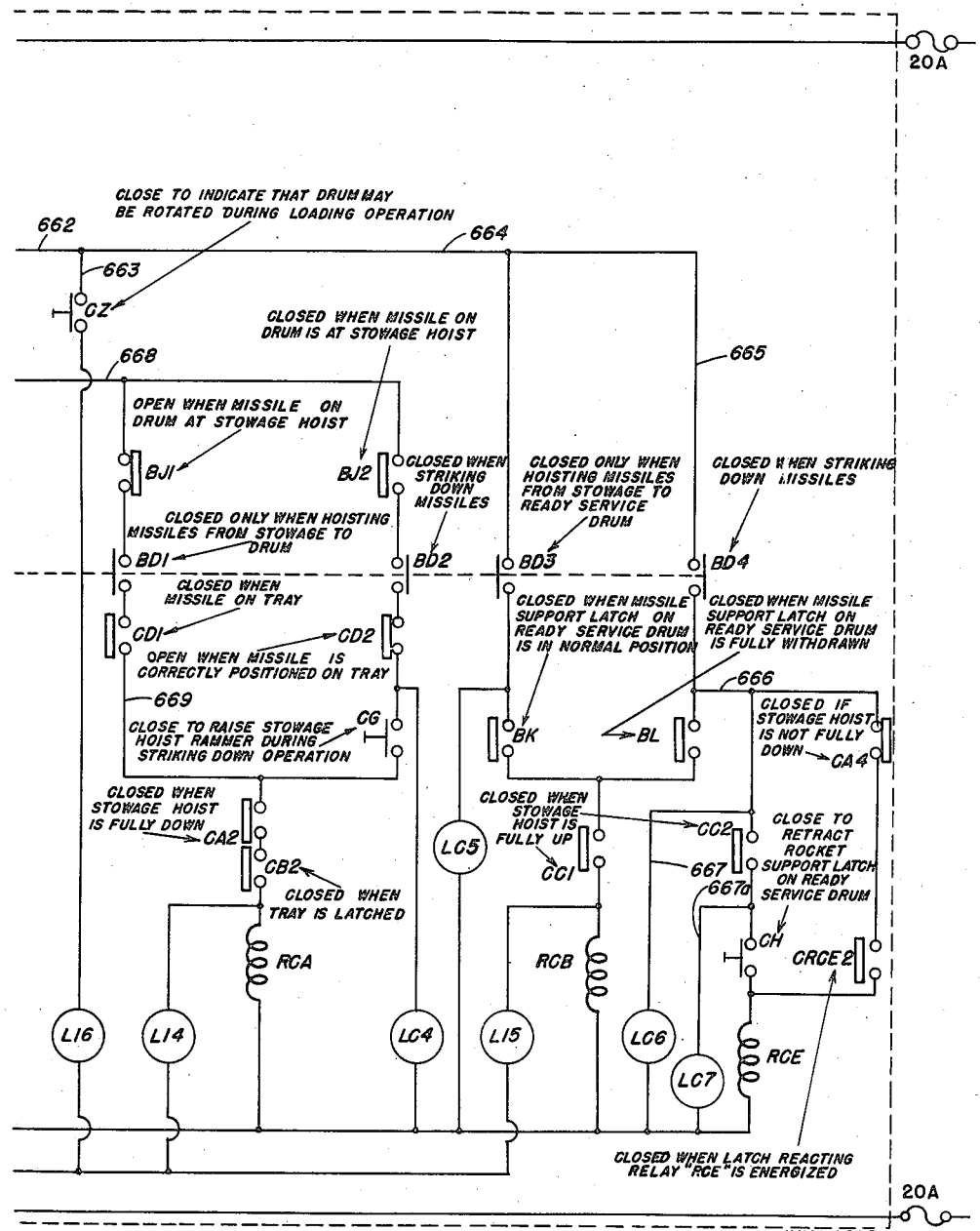

Figs. 3 to 8, inclusive, are schematic views illustrating the positions of the launching tube, launcher hoist, and ready service magazine during loading and firing operations which are effected by the electric-hydraulic system of the present invention;

Fig. 9 is a perspective view partially broken away and illustrating the stowage hoist control panel for the stowage hoist and the tray used to load missiles from below into the ready service magazine;

Fig. 10 is a time chart showing the manner in which the system of the present invention can be operated to effect relative movement of the launcher hoist, the launcher guide and ready service magazine during one complete cycle of automatic operation;

Fig. 11 is a schematic view showing the manner in which the electric-hydraulic system may be employed for lowering missiles from above-deck to the ready service magazine and thence by the stowage hoist to the missile stowage magazine or locker and further illustrating the relative positions of the several control panels of the present invention;

Fig. 12 is a block diagram of the hydraulic portion of the system of the present invention and which is employed to convey missiles to and from the launcher guide, for rotating the ready service drum and for lowering missiles into the ship's stowage magazine;

Figs. 13 to 17, inclusive, show the hydraulic power and control system employed for operating the launcher hoist and rotating the ready service magazine;

Figs. 18 to 21, inclusive, show the hydraulic power and control system for operating the magazine stowage hoist;

Fig. 22 is a face view of the main electrical control panel used in the present invention;

Fig. 23 is a schematic electrical diagram of the motor controller circuit for the pump which provides hydraulic power for operating the ready service magazine and both hoists;

Fig. 24 is a schematic electrical diagram of the motor controller which controls the train pump drive motor;

Fig. 25 is a schematic electrical diagram of the motor controller which controls the elevation pump drive motor;

Figs. 26 and 26A together constitute a schematic diagram of the electrical portion portions of the control system used in the present invention;

Figs. 27 to 30, inclusive, taken together show the major portion of the circuit of Figs. 26 and 26A with functional legends applied to the switch members; and Fig. 31 is a schematic representation by block diagram of a firing circuit with its interlocks, together with a face view of a firing control panel which may be used in the present invention.

The present invention is shown in connection with a shipboard type of missile launcher installation wherein all components of this invention are protected by location below-deck.

The launching system shown is particularly well adapted for use with the present invention. However, it will be understood that the electric-hydraulic system of the present invention may be used to advantage in many other types of installations whether in connection with a missile launcher or suitable industrial machinery. Therefore, it will be appreciated that the missile launching system shown and briefly described herein is not part of the present invention and that reference to the launching system is only made for the purpose of illustrating the manner in which the present invention operates.

A single launcher guide tube is shown supported by trunnions for pivotal movement from an upright loading position to an inclined firing position at which time it is lowered to some angle between 0° and 60° of elevation as determined by a signal received from the ship's gun director. This guide tube and its trunnions are mounted upon a carriage supported upon a mount which is similar to the conventional 40 mm. gun mount and includes the necessary apparatus for moving the guide tube both in train and elevation in response to director signals received from conventional fire control equipment. By this means the mount may be moved in train and in elevation so that it may bear upon the target up to the very instant of firing.

A second component part of this launcher is a hoist mechanism which operates to deliver rockets or other missiles from a below-deck ready service magazine into the launcher guide tube when it is at its 90° elevated or loading position.

A third component is, in the example chosen for illustration, a below-deck ready service magazine in the form of a large upright drum having a plurality of missile receiving stalls spaced about its periphery. However, it will be understood that, instead of the ready service magazine, any movable storage structure found suitable for the desired purpose in any installation may be employed in connection with the present inventon. By means hereinafter to be described the drum may be rotated to successively present missiles to the launcher hoist for loading into the guide tube.

A fourth component of the launching system with which the present invention may b employed is the provision of a stowage hoist whereby missiles may be supplied to the stalls of the ready service magazine from a remote missile stowage compartment so as to replenish the supply of missiles in said ready service magazine during a period when the launcher is not in automatic operation. This stowage hoist embodies transfer means including a tray upon which the missiles may be loaded and which tray then tilts to transfer the missiles from a horizontal stowed position to an upright position in alignment with the stowage hoist whereupon they may be moved into empty stalls of the ready service magazine.

The first three components above set forth work together during automatic firing operation which is effected by the present invention to automatically and continually load and fire missiles until the supply in the ready service magazine has been exhausted or until a "cease fire" order is given. Thereafter the last component, the stowage hoist, works to reload the ready service magazine so that it will be ready for another burst of automatic fire when the electric-hydraulic system is again set in operation. These operations are carried on in timed relationship under the control of electrical and hydraulic interlocks of the present invention and which assure the completion of each step before the start of the next.

In normal service, operation of the missile launcher is remotely controlled by a director fire control system. When the launcher is in operating condition, and is following the director, the entire magazine supply of 22 missiles may be loaded and launched in succession simply by closing the firing circuit of the present invention and hereinafter described and holding it closed. During this automatic loading and launching operation, no action is required of launcher personnel. The firing of the launcher is controlled remotely, and successive loading of missiles from the ready service magazine is performed automatically by the missile hoist actuated by the present invention, hence personnel are not stationed in or about the mount above-deck during firing operation. Local control of the firing circuit of the invention may be provided at a below-deck control station as an alternative to director firing.

Referring particularly to Figs. 1 to 8, inclusive, the missile launcher is shown as it may be installed on a naval vessel with an above-deck mount generally designated 100, a below-deck ready service magazine 101 and a missile hoisting mechanism 102 adapted to convey missiles from the magazine directly into a missile guide tube 103 carried by the mount.

Immediately below the deck 114 may be located the launcher magazine or ready service magazine 101 which in the present embodiment includes an upright drum mounted upon a suitable bearing 116 for rotation about its vertical axis 117. A number of missiles 118 may be supported in stalls 119 formed by guide rails 120 spaced about the periphery of the ready service magazine and so arranged as to bring each missile into axial alignment with the center of rotation of the mount as the magazine is indexed during a missile loading operation.

When a missile has been moved into alignment with the axis of rotation of the launcher mount and the guide tube 103 is vertical, the missile may be automatically raised from the ready service magazine into the guide tube by means of a launcher hoist 102, the sequence of operation of which is schematically illustrated in Figs. 3 to 8, inclusive. In Fig. 3 the guide tube 103 supported upon the carriage 106 is shown in the vertical loading position and the ready service magazine 101 is shown loaded with several missiles 118, one of which 118a, is located in coaxial alignment immediately below the upright guide tube 103. The rear end or shroud 121 of the missile is positioned at that time just above a hoist lifter member 122.

In Fig. 4 operating switch 123 has been closed and, as the first step of the automatic launcher operation, the hoist 102 is energized to raise lifter 122 by means of a rammer type one-way chain 124 so as to lift the missile 118a into the guide tube 103 where it is retained by suitable retaining latches hereinafter described. As shown in Fig. 5 the rammer then descends and guide tube 103 pivots about its trunnions to the firing elevation as determined by the conventional fire director means aboard ship and, as shown in Fig. 6, as soon as the hoist lifter reaches the bottom the ready service magazine may index to move another missile 118 into the loading position.

When the guide tube 103 descends to the desired elevation the missile is automatically fired as indicated in Fig. 7, whereupon the guide tube 103 starts automatically to return to its upright position as shown in Fig. 8. If switch 123 is maintained closed, then the hoist 102 automatically proceeds to load another missile into the guide tube from the ready service magazine 101. This operation continues until switch 123 is opened or until the supply of missiles in the ready service magazine is exhausted.

The hydraulic power and control systems

The present invention provides, among other novel features, hydraulic power means for raising and lowering the launcher hoist; for indexing the ready service magazine drum; for operating the ship's stowage hoist and for actuating the stowage hoist transfer tray.

In Fig. 12 is illustrated by block diagrams a schematic representation of the novel hydraulic system shown in detail in Figs. 13 to 21, inclusive. Many of the hydraulic components, such as the supply tank, filters, pump, pump valve block and accumulator are mounted on a stationary platform within the ready service magazine drum so as to provide a compact arrangement wherein the hydraulic lines may be kept to minimum lengths. As illustrated in Fig. 12, a tank 380 provides a source of hydraulic fluid to a pump 381 from which fluid under pressure emerges to pass through filters 382 and 383 to a pump valve block 384. From the pump valve block the fluid passes to an accumulator 385 where it is stored under pressure and from which it is distributed to the various hydraulic units of the system.

From the accumulator the hydraulic fluid is distributed to a ready service magazine drive unit 386; a launcher hoist operating cylinder 255; a stowage hoist operating motor 295; and a stowage hoist tray operating cylinder 290. As illustrated, suitable control and interlock means are provided so that the desired sequential operation of these components may be obtained. Such control means includes a ready service magazine control block 387 and a launcher hoist control valve block 388.

Considering the diagram first with respect to the operation of the ready service magazine drive unit and the launcher hoist operating cylinder only, it will be noted that a ready service magazine latch valve 389 is connected to both the ready service magazine control block 387 and the launcher hoist control valve block 388. The purpose of this interlock arrangement is to prevent operation of one when the other is operating. As will hereafter become apparent, the hoist interlock valve 390 unless actuated will prevent shifting of the ready service magazine latch valve and hence prevents retraction of the ready service magazine latch member, and, by interlock circuits, conditions the launcher hoist control valve block 388 and the ready service magazine control block 387 for operation while simultaneously releasing the ready service magazine drive unit brake 391.

A hoist latch 392 is normally biased to keep the hoist operating shaft 253 in raised position and this latch is retracted when operating pressure is built up in the accumulator. This latch simply serves to keep the hoist from creeping out of position when there is no pressure in the accumulator. The manner in which the interlock valve 390 is operated by a cam on the hoist rammer chain is schematically shown in this drawing.

Considering now the stowage hoist motor 295 and the stowage hoist tray operating cylinder 290; these units receive hydraulic pressure from the accumulator through an emergency stop valve 393 which may be of the quick acting manually operable type. The hydraulic fluid thereupon passes through separate flow control valves 394 and 395, one for the stowage hoist motor and the other for the stowage tray operating cylinder. From flow control valve 394 the fluid passes through an acceleration control valve 396 which is cam operated to control the speed of operation of the stowage hoist as it reaches its upper or lower operating limit. A reversing valve 397 actuated by solenoids automatically returns the hoist to its lower position at the end of each operating cycle. A brake 398 is connected to the hydraulic line between the acceleration control valve 396 and the reversing valve 397 so that the brake is released whenever power is supplied to the stowage hoist motor 295 to drive the same.

From flow control valve 395 hydraulic pressure passes to a stowage tray solenoid actuated reversing valve 399 which determines the raising and lowering movements of a tray operating cylinder 290.

The launcher hoist and ready service magazine hydraulic system

In Figs. 13 to 17 is shown in detail the hydraulic system employed to operate and control the hydraulic drive of the launcher hoist and the ready service magazine.

Figure 14:
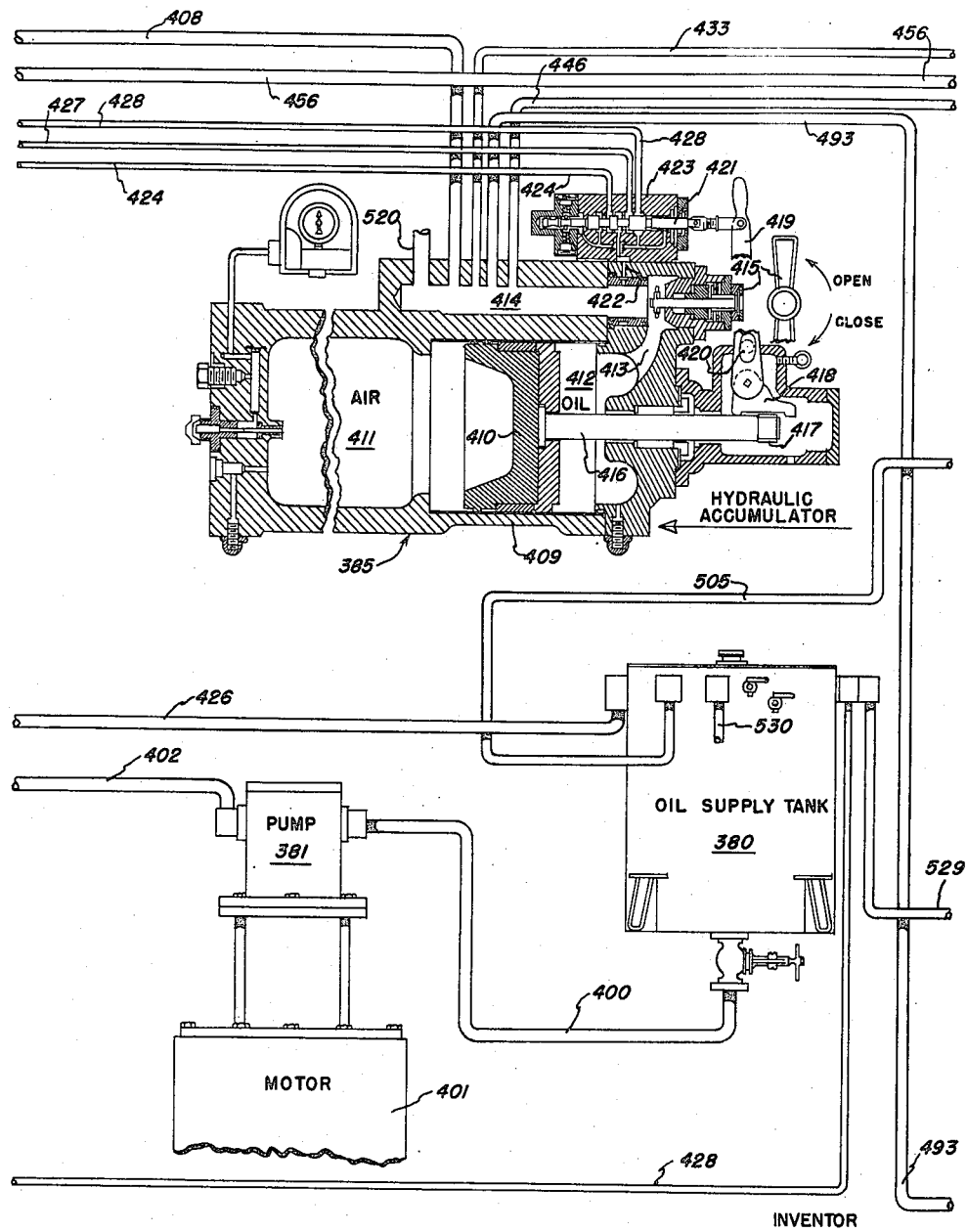

Referring first to Fig. 14 there is provided a fluid supply tank 380 from which oil passes through line 400 to the inlet of a pump 381 driven by suitable means such as a constant speed electric motor 401. The output of this pump is directed through line 402 to a first filter 382 (Fig. 13) and through line 403 to a second filter 383 from which it emerges through line 404 to enter the right side of a pump valve block 385. Within the pump valve block the entering fluid is received by a spool type unloading valve 405 which is normally spring biased to its lower position as shown to permit the fluid under pump pressure to pass through a lower channel 406 and past a spring biased check valve 407 to leave the pump valve block through line 408 connected to manifold 414 of a hydraulic accumulator 385 (Fig. 14).

The hydraulic accumulator 385 may be of any satisfactory conventional design and, in the embodiment illustrated, comprises a cylindrical housing 409 which receives a movable piston 410 having on its left side an air chamber 411 and on its right side a hydraulic fluid chamber 412. The latter communicates through passage 413 with the hydraulic oil manifold 414. Passage 413 may be closed by manipulation of a manually operable valve 415.

In order to maintain the hydraulic fluid flow within prescribed limits the piston 410 is provided with a central shaft 416 having an enlarged tripping cam 417 at its right end, which cam engages the trigger portion 418 of an accumulator pilot valve operating arm 419 so that as piston 410 moves to the extreme left as it does when the quantity of fluid in chamber 412 reaches the desired amount, shaft 416 with its cam 417 moves to the left and engages the trigger to fulcrum the pilot valve operating arm 419 about its pivot 420 thereby drawing accumulator pilot valve 421 to the right. This movement permits fluid under pressure to pass from manifold 414 through channel 422 and emerge from the pilot valve housing 423 through pilot line 424 to be conducted to the bottom of the unloading valve 405 (Fig. 13) and raise that valve against the compression of its spring and thereby disconnect the fluid inlet 404 from the channel 406 and connect such inlet 404 to the oil supply tank return channel 425 which connects with return line 426 leading back to the top of the oil supply tank 380. In this position the flow of fluid from the pump 381 simply recirculates back to the supply tank.

When the amount of fluid within the accumulator manifold 414 drops below the desired quantity, then the pressure of the air in chamber 411 returns the piston 410 to the right carrying with it shaft 416 and its cam to act upon the trigger 418 to return the upper end of the accumulator pilot valve control lever 419 to the left thereby moving the pilot valve 421 to the position shown whereby the fluid pressure from manifold 414 passing upwardly through port 422 emerges through line 427, assisting the spring to move the unloading valve 405 (Fig. 13) to its lower position so that the accumulator is again charged as hereinabove pointed out.

In order to permit the pump to be operated for testing and warm up purposes, without building up pressure in the accumulator, and in order to release accumulator pressure when desired, there is provided a manual by-pass valve 429 which may be operated to connect channel 430 to channel 426. A suitable relief valve 431 is provided to vent inlet pump pressure from line 404 to line 426 if it exceeds a predetermined relief valve adjustment pressure which may be varied by changing the tension on a spring 432.

Assuming that the ready service magazine is loaded, a missile has been indexed to hoist loading position (Fig. 3) and an automatic cycle is being initiated; in this condition the hoist lifter 122 (Figs. 3 and 17) is at its lowermost position and the ready service magazine drum is locked by engagement of a suitable latch 265 (Fig. 15) in one of a plurality of notches provided in a flange or indexing circle adjacent a ring gear on the magazine drum to prevent rotation of the drum during the operation of the launcher hoist. With accumulator pressure built up (Figs. 13 and 14), fluid under pressure leaves manifold 414 through lines 433, 434 and 435 to act upon the hoist latch 392 (Fig. 17) to force the latch spool 436 downwardly and withdraw the latch member 437 which has been in engagement with the collar 438 upon the hoist operating cylinder shaft 253 to permit the launcher hoist to be operated.

At the same time pressure through line 433 (Fig. 15) enters the ready service ring latch valve 389 which, when in latched position, permits pilot pressure to flow past a latch valve spool 439 and out through line 440 to the hoist valve control block 388 (Fig. 16) where it is applied to the hoist direction pilot valve 441. By energizing solenoid SBA spool valve 441 is shifted to the right to port pilot pressure from line 440 to channel 444 to pass upwardly to the left-hand end of a hoist direction control valve 445 shifting the latter to the right so that pressure from the accumulator manifold arriving through line 446 is diverted into channel 447 leading to the speed control valve 448 from which it emerges through line 449 to enter the top of the hoist operating cylinder past maximum speed control valve 450. This forces the hoist operating piston down and hoists the rocket into the guide tube.

Return fluid from the lower end of the hoist cylinder flows out line 451 through the maximum speed control valve 452 which is adjusted to limit the maximum speed at which it is desired the hoisting operation shall take place and returns through line 453 which leads to the opposite end of the speed control valve 448 through which it may pass to enter channel 454 leading to the direction control valve which has now been moved so as to connect channel 454 with channel 455 connecting to return lines 456 and 426 so that the fluid may return to the oil supply tank 380.

As soon as the missile lifter 122 starts its upward movement a cam 458 (Fig. 17) on the hoist rammer chain 459 moves out of engagement with the end of a rocket arm 460 which is connected by link 461 to the stem of spool 462 of the interlock valve 390. This permits compression spring 463 acting on the lower end of the spool 462 to move the spool upwardly thereby blocking the flow of fluid from pilot line 434 and 464 through the valve and out pilot line 465 extending to the ready service magazine control block 387. This prevents operation of the ready service magazine drive unit during movement of the hoist lifter as hereinafter will become apparent.

When a missile has been hoisted into the launching tube an interlock switch there located closes an electrical circuit to energize solenoid SBB (Fig. 16) to move the hoist direction pilot valve 441 to the left. This permits pilot pressure entering from line 440 to pass through channel 467 leading to the right end of the direction control valve 445 thereby shifting the direction control spool valve to the left and porting the entering fluid pressure from the accumulator through line 446 to channel 454 through speed control valve 448 to line 453 communicating with the lower end of the hoist operating cylinder so as to raise the hoist piston and consequently lower the hoist lifter member so that it may be in position to receive a new missile.

At the same time fluid from the upper end of the hoist operating cylinder is ported through the maximum speed control valve 450 which limits the rate of lowering of the hoist lifter and thence through line 449 to the speed control valve 448 through conduit 447 to the direction control valve 445 and out through return lines 456 and 426 to the oil supply tank 380.

It will be noted that solenoid SBB which initiates lowering of the hoist may be provided with a control knob 468 by which the hoist direction pilot valve 441 may manually be shifted to the left and hence by local control the hoist may be lowered.

When it is desired to operate the hoist slowly, as for example, when lowering an unfired missile from the guide tube back into the ready service magazine, a solenoid SBE may be energized to move the speed pilot valve 470 back to the right. This ports pilot pressure from channel 471 to channel 474 which leads to the left end of the speed control valve 448 forcing said valve to the right so as to close the passage between channels 454 and 453 and also the passage between channels 447 and 449. Thus, the fluid is diverted so as to pass through channels 477 and 478 to the respective slow speed adjusting valve 475 which controls the hoisting slow speed and slow speed adjusting valve 476 which controls the lowering slow speed. Suitable creep adjustment valves 479 and 480 may be provided at the upper and lower ends of the hoist operating cylinder.

Figure 15:
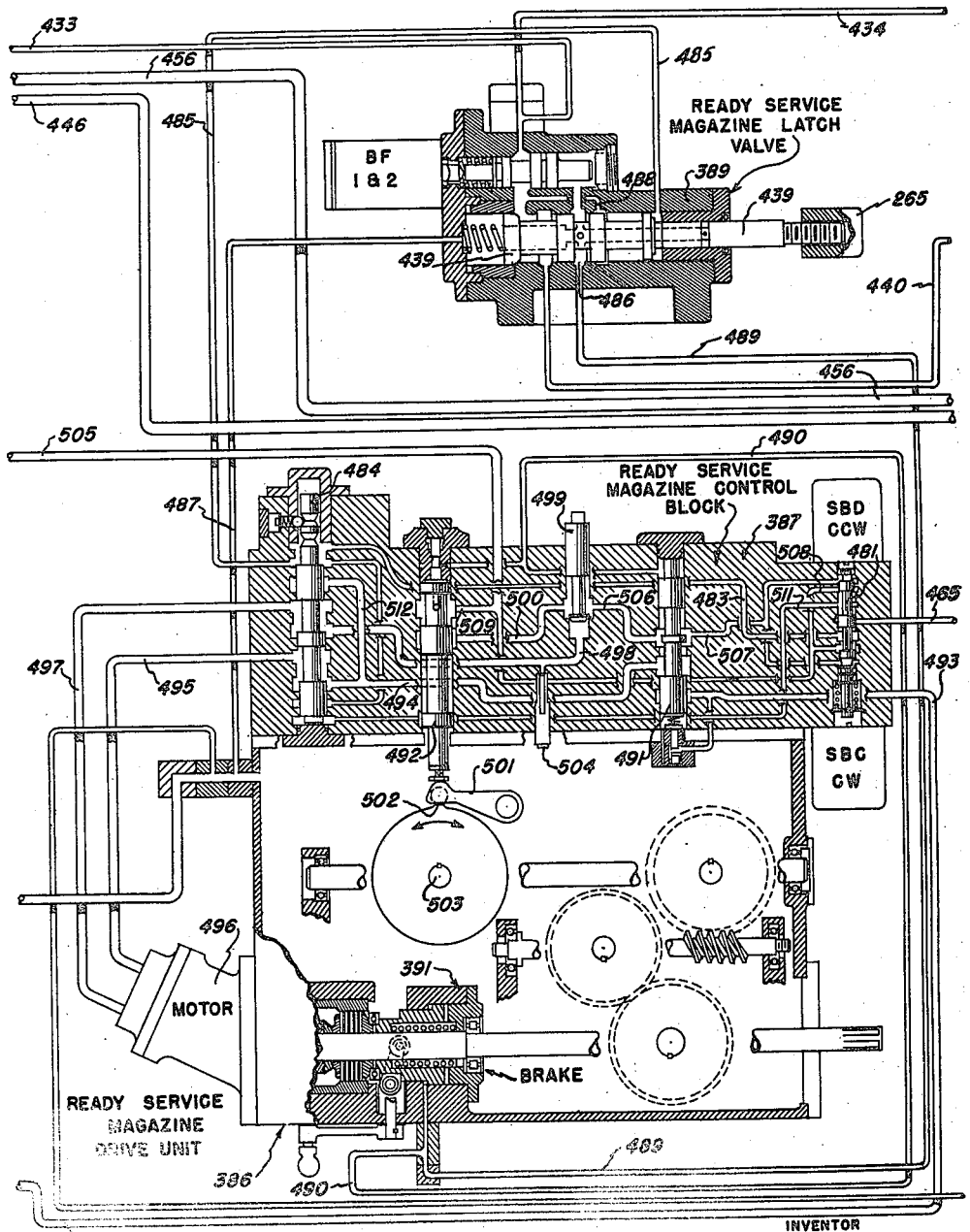

When the hoist lifter 122 (Fig. 17) approaches the bottom of its travel the cam 458 on the hoist chain 124 engages the lever 460 to force link 461 downwardly lowering the interlock valve spool 462, and hence porting pilot oil pressure from line 434 through the interlock valve 390 to pilot line 465 leading to the ready service magazine control block 387 (Fig. 15). At the ready service magazine control block the entering pilot oil is controlled by a ready service magazine direction pilot valve 481 which is operable by solenoids mounted at its opposite ends so that upon energization of the lower solenoid SBC, for example, the ready service direction pilot valve is raised and oil entering from pilot pressure line 465 is ported through channel 483 to the upper end of a reversing valve 484 to move that valve downwardly. Simultaneously pressure from line 483 passes out through line 485 extending to the ready service magazine latch valve 389 where it acts upon the spool 439 to move it to the left together with a latch 265 to withdraw the latch from one of the notches in the ready service magazine indexing circle.

When the spool 439 moves to the left it blocks pilot pressure from line 440 diverting it through a small opening 486 to drain line 487 and simultaneously communicates pilot pressure line 433 through channel 488 with line 489 leading to the brake 391 and at the same time pilot pressure flows by way of line 490 to the top of blocking valve 491 and to the top of the deceleration valve 492. When the pilot pressure through line 485 has shifted the ready service magazine latch valve to the unlatched position as foresaid and has permitted pilot line pressure from line 433 to enter line 489 and release the brake 391, the pressure rises within line 490 acting upon the top of valve 491 and forces that valve downwardly to port accumulator pressure from line 493 to channel 494 and through reversing valve 484 to motor line 495 leading to the hydraulic motor 496 which operates the ready service magazine drive unit.

A return line 497 leads from the motor 496 to the reversing valve 484 where it connects with channel 498 in which is interposed a present maximum speed control valve 499 having a passage 500 leading to the deceleration valve 492. This latter valve is closed since the roller at the end of its operating lever 501 is riding upon the lobe 502 of a cam 503 which is driven by the hydraulic motor through the various shafts and gears indicated, however, a small portion of the hydraulic fluid from the return line 498 is permitted to leak through a creep adjustment valve 504 to a tank return line 505. Through speed control valve 499 a portion of the fluid flows through a channel 506 which leads through blocking valve 491 to channel 507 which is branched to connect to the upper and lower ends of the ready service magazine direction pilot valve 481.

As will be seen by examination of Fig. 15, positioning of the ready service magazine direction pilot valve 481 at its upper limit, as by energization of solenoid SBC permits a slight amount of the motor discharge pressure to be vented to a return line 508 which connects to the return line 505. This arrangement permits the hydraulic motor to rotate the ready service magazine at a slow rate until the lobe 502 moves out from under its roller and deceleration valve 492 is permitted to move downwardly under the pressure at its upper end coming through line 490 from the ready service magazine latch valve. When this occurs channel 500 is ported to channel 509 and connects directly to the return line 505 permitting accelerated rotation of the ready service magazine. It will be apparent that as the lobe again raises the roller of the deceleration valve arm 501, the valve returns to its illustrated position blocking off passage between channels 500 and 509, thus decelerating the ready service magazine during the final portion of its rotation.

During loading operations or for other purposes it may be desirable to rotate the ready service magazine in the opposite or counterclockwise direction and for this purpose solenoid SBD may be energized to move the ready service direction pilot valve 481 downwardly to thereby connect pilot pressure line 465 with channel 511 to conduct fluid to the lower end of the reversing valve 484, thus raising that valve so as to connect channel 494 by means of branch line 512 with motor return line 497 so that fluid under pressure passes through line 497 through motor 496 and back out line 495 to return through the reversing valve which in its upper position ports return fluid to channel 498 where it is controlled in the manner hereinabove described for clockwise rotation.

*The stowage hoist and tray hydraulic system*

In order to load missiles into the ready service magazine from the ship's stowage lockers and for striking down operations whereby missiles may be lowered from above deck into the ready service magazine and from there to the ship's lockers, there are provided separate stowage hoist and stowage tray drive mechanisms which may be hydraulically actuated in accordance with the present invention and from the same source of hydraulic pressure as is described above.

As shown in Fig. 12, a single emergency stop valve 393 connected to the accumulator by a hydraulic fluid line controls the flow of hydraulic fluid to both stowage hoist motor 295 and tray operating cylinder 290. This hydraulic line may lead from the accumulator manifold 414 (Fig. 14) through line 520 to an emergency stop valve 393 illustrated in the schematic detailed representation of the stowage hoist and tray operating circuit comprising Figs. 18 to 21, inclusive. As there illustrated, hydraulic fluid entering from line 520 under accumulator pressure acts upon a free-floating unbalanced valve stem 521 to raise said valve and flow out through line 522. The undersurface of the unbalanced valve 521 is normally vented to a return line 523 and the upper surface communicates with a control line 524 leading to a three-way pilot valve 525. When the handle 526 of this valve is in the up position, the top of the emergency stop valve piston 521 is vented through line 527 to return line pressure via lines 528 and 529 and 530. The incoming pressure is conducted through pilot line 531 to the three-way pilot valve housing 525 in such a manner that when the handle 526 is lowered to the stop position the incoming pressure is ported to line 524 while line 527 is cut off. The incoming pressure acting through line 524 upon the head of the piston 521 forces the piston firmly to its seat against the differential of lower pressure existing in line 523 and hence immediately interrupts the pressure flow to the entire stowage hoist and tray operating hydraulic system.

Figure 19:
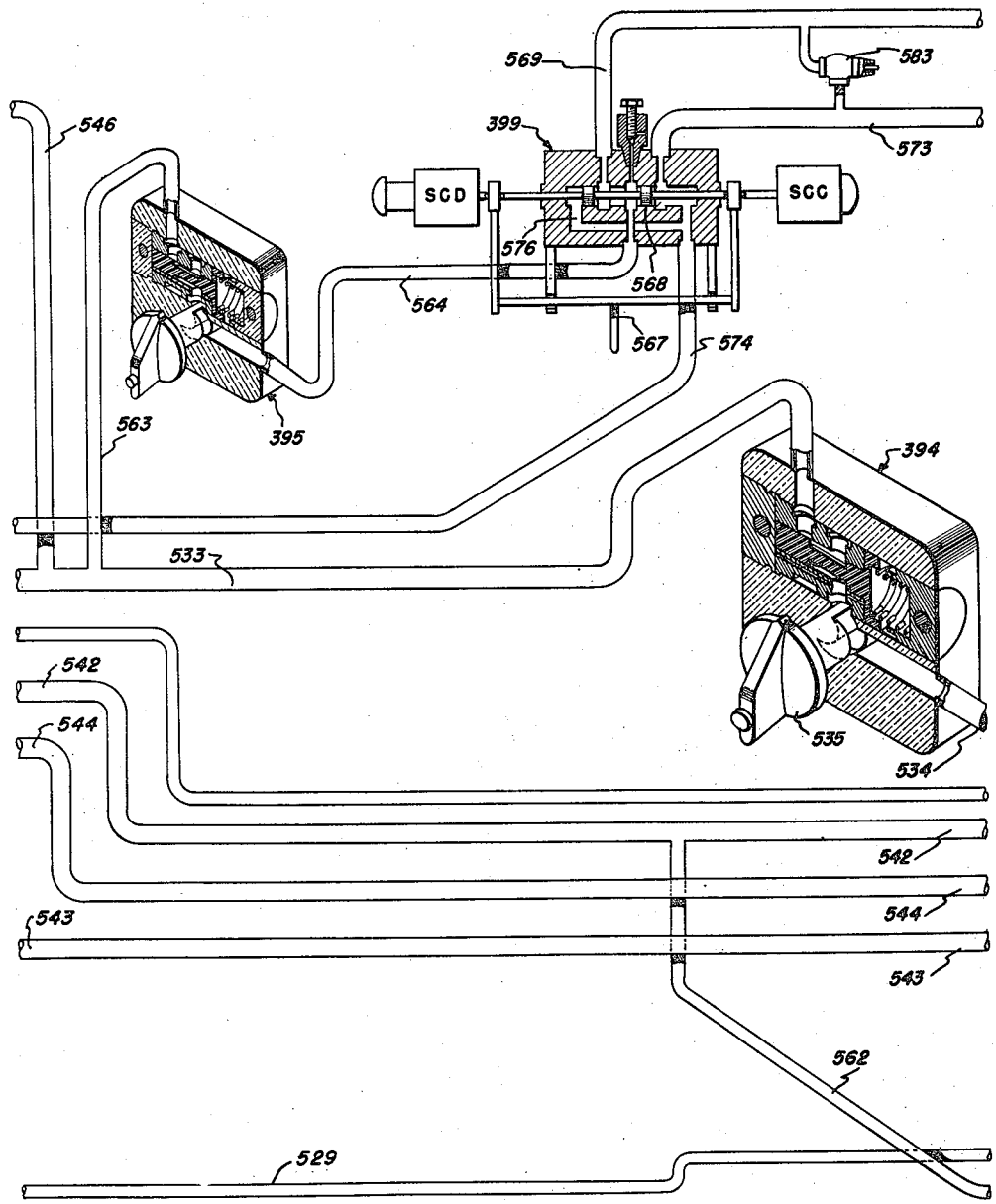
Figure 20:
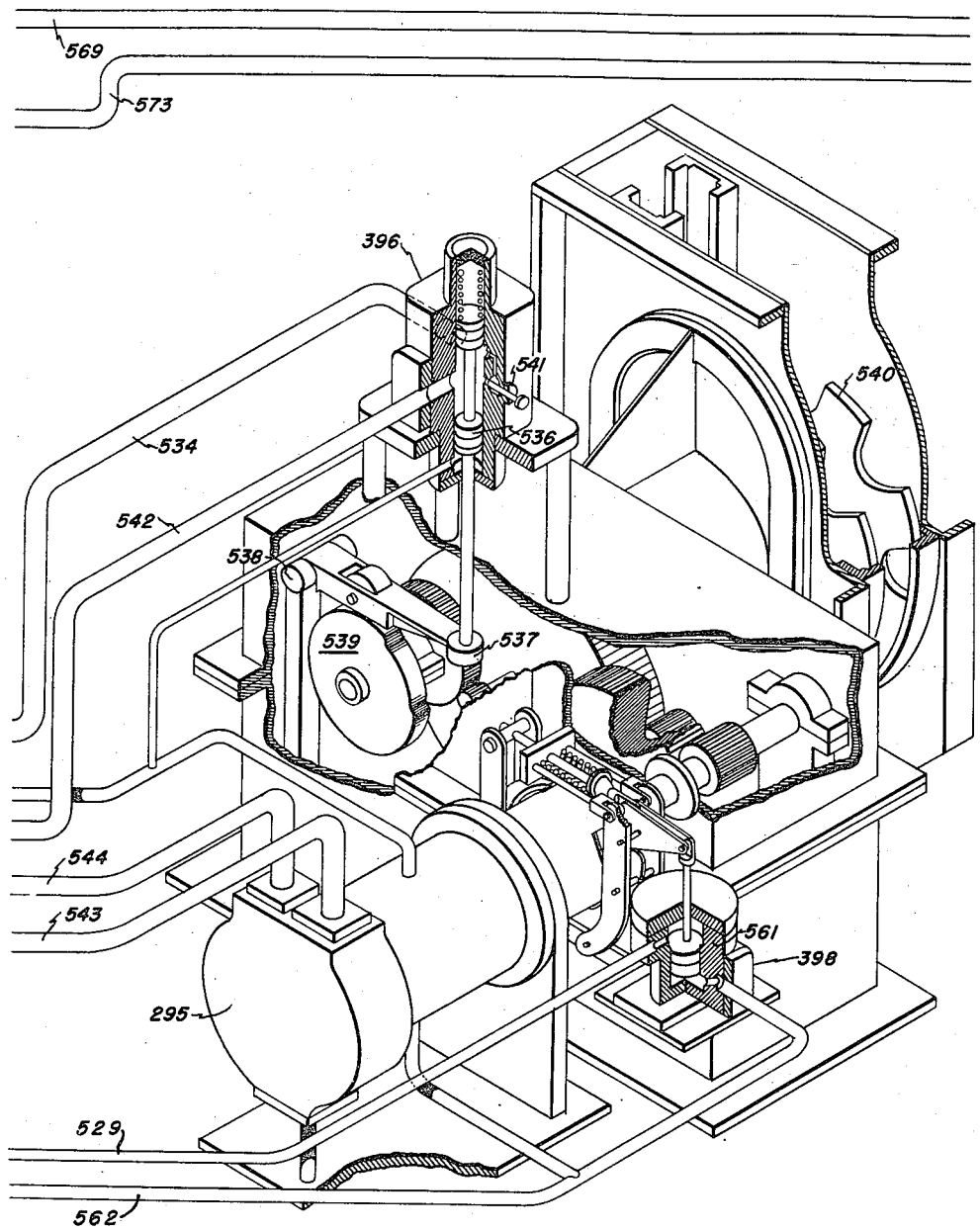

From the emergency stop valve through line 522 the hydraulic fluid passes through a check valve 532 to line 533 and thence to a hoist flow control valve 394 (Fig. 19). This valve may be of the construction illustrated in H. F. Vicker's Patent 2,272,684 issued February 10, 1942, to utilize the principle that if a given pressure differential is maintained across an orifice of given size the flow through said orifice will remain constant. The effect of this valve is to maintain a predetermined constant volume of hydraulic fluid flow from the hoist flow control valve 394 to the hoist motor 295. The hoist flow control valve 394 is provided with a handle 535 which may be adjusted to vary the rate of flow of fluid out through line 534 leading to an acceleration control valve 396 (Fig. 20).

Valve 396 controls acceleration, deceleration and speed of the hoist in either direction and includes a vertically reciprocable spool member 536, the elongated lower end of which bears against a tappet member 537 which is pivoted at 538 and has a roller which bears against the periphery of a cam wheel 539. The cam wheel 539 is geared to the stowage hoist operating sprocket 540 so as to make a substantially complete revolution during a complete stroke of the hoist. The cam drive ratio is such that the spool valve member 536 is normally raised upon the lobe of the cam except near the end of the raising and lowering stroke of the stowage hoist rammer at which times the valve is moved downwardly to first throttle, and then completely shut off the passage of fluid therethrough.

A creeping, holding and leveling valve 541 of the needle valve type may be so located as to by-pass a very small part of the fluid flow around the upper part of the pilot and accelerating control valve 396 when the valve is in the down position. This assures that the stowage hoist will "creep" to its positive stops at each end of its movement and be held in such positions by pressure in the line which might otherwise drop due to leakage, etc.

From valve 396 the pressure then passes through line 542 to a hoist reversing valve 397 (Fig. 18) which is connected to the stowage hoist drive motor 295 by means of conduits 543 and 544. The reversing valve 397 is controlled by a pilot valve 545 which has a high pressure inlet from line 533 by means of line 546 and contains a spool valve 547 which may be shifted, either to the right or the left by a hoist up solenoid SCA and a hoist down solenoid SCB, respectively. This valve is also capable of manual operation by manipulation of a removable handle 550 which is insertable in an opening in an operating bar 551 which has terminal portions acting upon opposite ends of the spool valve 547. In the position illustrated in the drawings solenoid SCB has been energized to shift the valve stem 547 to the left, thus porting pilot pressure through line 552 to the left end of a reversing valve spool 553 thereby shifting said spool to the right and permitting pressure from the pilot and accelerating control valve 396 passing through line 542 to be ported to reversing valve outlet line 543 extending to the stowage hoist operating motor 295. The return line from said motor is through line 544 to the reversing valve 397 and hence through channel 557 to line 528 for return via lines 529 and 530 to the main hydraulic supply system. For this purpose, line 530 may return directly to the oil supply tank 380 (Fig. 14).

When solenoid SCA is energized in order to raise the stowage hoist lifter, then spool valve 547 is shifted back to the right and pilot pressure from line 546 thereupon passes out through line 555 to the right-hand end of the reversing valve spool 553 to move said spool to the left, thereby permitting entering fluid pressure from line 542 to be ported to line 544 and thereupon drive the stowage hoist motor 295 in the opposite direction so as to raise the stowage hoist. The discharge from said motor then passes through line 543 and channel 556 which communicates with conduit 557 and joins line 528 to return to the supply tank. Between lines 557 and 528 is interposed a back pressure valve 558 which is urged to the right by a spring 559 and is urged to the left by the pressure in a chamber 560 which communicates with inlet line 542. By proper selection of the spring 559 the device may be adjusted so that a predetermined back pressure is maintained in the system at all times irrespective of direction of operation of the stowage hoist motor.

A brake 398 (Fig. 20) is provided in the stowage hoist drive system and is preferably positioned adjacent the stowage hoist drive motor 295 as illustrated. The operating means for this brake may include a cylinder 561 containing a piston to which operating pressure may be applied through line 562, and since line 562 connects to the main pressure line 542 leading from the pilot and accelerating control valve 396, the brake will automatically be released each time the motor 295 is energized for driving in either direction.

Figure 21:
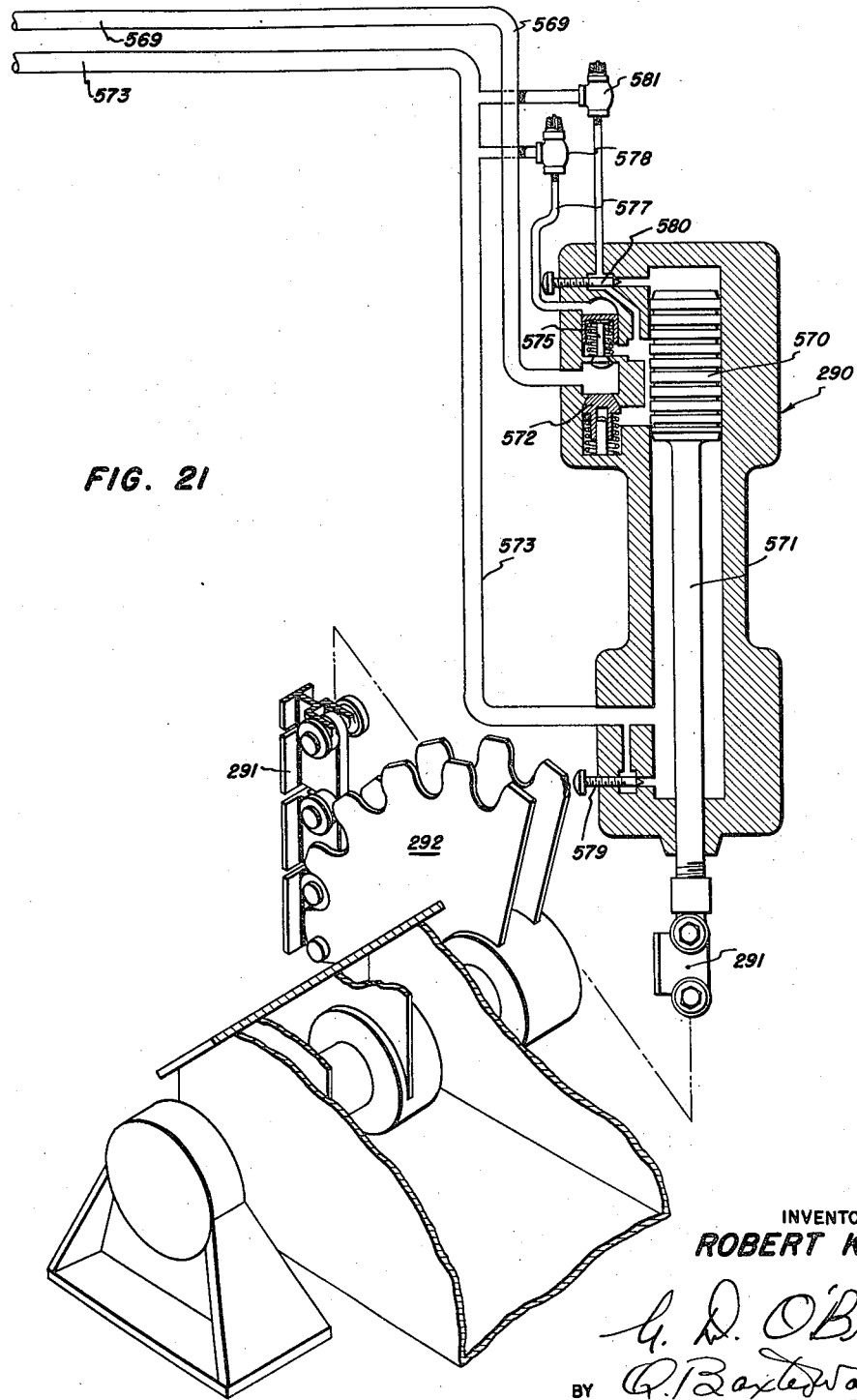

From the main hydraulic fluid pressure line 533, fluid pressure may be drawn for operation of the tray operating mechanism by means of line 563 connected to a tray flow control valve 395 (Fig. 19) which may be identical to the hoist flow control valve 394 described above. From that valve and through line 564 fluid at a uniform rate of flow is conducted to a reversing valve 399 which, like the pilot valve 545 aforesaid, may be operated by an up solenoid SCC or by a down solenoid SCD, or by a removable handle 567. Within the reversing valve is a spool valve member 568 having oppositely extending stem portions engageable by the solenoids so that upon energization of solenoid SCC, for example, the tray may be raised to the up position through the shifting of the spool 568 to the left thereby porting pressure from line 564 through the valve and out through line 569 to enter the top of the tray operating cylinder 290 (Fig. 21). This forces downwardly a piston 570 connected to a shaft 571 to drive downwardly the tray chain 291 thereby rotating the spur sector 292 to raise the tray 298 to its upright position. The fluid under pressure coming from line 569 forces its way past a tray up control valve 572. The fluid in the space below the piston 570 is ported out through line 573 back to the reversing valve 399 from which it emerges through a return line 574 connecting with return lines 528, 529 and 530 which communicate with the supply tank 380.

To reverse the operation and lower the tray, solenoid SCD (Fig. 19) is energized to drive the reversing valve spool 568 to the right thereby porting inlet pressure from line 564 to line 573 from which it passes to the undersurface of the piston 570 to raise it to the uppermost limit of its movement. During the upward movement of piston 570 fluid escaping from above the piston is unable to pass through one-way valve 572 and hence must pass through the poppet type down control valve 575 which when open allows fluid to return through line 569 to the reversing valve from which it is ported through channel 576 to line 574 and thence back to the main hydraulic supply. The upper end of poppet valve 575 is vented through line 577 and a control valve 578 to line 573. Thus, the pressure below the piston 570 acts upon the upper surface of valve 575 to open that valve only when pressure exists in line 573. The control valve 578 permits varying the speed of operation of the down control valve 575 by controlling the flow of fluid thereto.

Tray acceleration and deceleration needle valves 579 and 580 control the final movement of the tray operating piston and a suitable by-pass valve 581 may be connected in the line linking valve 580 with line 573. Suitable crossover valves 582 and 583 (Figs. 18 and 19) may be provided as illustrated to shunt the tray operating and hoist operating power lines if desired. A hand pump 584 may be employed to assist in completely draining the system.

*The electrical power and control system*

The hydraulic power for raising and lowering the launcher hoist, rotating the ready service magazine and raising and lowering the stowage hoist and its tray may be provided by pumps driven by electric motors operated by the ship's electrical system and these motors together with the hydraulic control valves may be controlled and actuated by the novel power and control circuits as illustrated in Figs. 22 to 30, inclusive.

Considering first the ready service drum and hoist motor controller circuit illustrated in Fig. 23. As there shown, the three-phase ship's electrical circuit is tapped by lines 600, 601, and 602 which may pass through a manual circuit breaker CB and three main controller contacts C, through coils 603 of overload relay OR and to the electric motor 401 which drives the large hydraulic pump 381 (Fig. 14). In order to close the contacts C of the main controller, a start pushbutton BT (Fig. 22) may be depressed to conduct current through control line 604 to the center contact of switch BT, down through line 605 to one side of normally closed stop switch BU, through line 606 to the operating coil 607 of relay C and thence back through line 608 to main line 601. Coil 607 thereupon closes contacts C of the main controller to connect the motor 401 directly to the line and start the motor.

Simultaneously with the above, current flows from pushbutton switch BT through line 609, the coils 610 and 611 of reset relays RR, and through line 608 to main line 601. Coils 610 and 611 reestablish overload relay contacts OR if they had been broken and hence current may now pass from line 604 through line 612 and contacts C—OR—OR to stop switch BU and hence back to the main line 601. This provides a holding current through coil 607 to maintain the main motor controller contacts C in engagement. The motor will stop either upon manual opening of pushbutton contacts BU or by separation of a pair of overload relay contacts OR—OR upon a predetermined overload being imposed upon the drive motor 401. In order to show operation of the hoist pump drive motor, there is provided a pilot light LH mounted upon the control panel (Fig. 22).

Similarly to the above there are provided suitable train and elevation motor controller circuits which, because they may be controlled if desired by interlocking portions of the launcher circuit are shown in Figs. 24 and 25. As shown in Fig. 24 the train motor may likewise be tapped to the ship's electrical system and current passes from the ship's power lines by lines 601, 602 and 603 through a manual switch PS, main motor controller contacts C and the coils 599 (OR—OR) of an overload relay to the train pump drive motor 613. In order to start the train power supply motor, control handle BP upon the control panel Fig. 22 is set at the start position and the start pushbutton BV is depressed. Current may then pass from wire 601 to main controller operating coil 614, thence through line 615, switch BP1, and line 616 to the start pushbutton BV; down line 617 to stop pushbutton BW and through line 618, and switch BS2 which is the manual above-deck stop switch, through contacts AM which are open when the train is set for manual operation, and through the contacts of switch AK which is closed when the train stowage pin is moved to the unlocked position, returning by line 619 to the main line 602.

Control handle BP, unless moved to the "Start" position, opens contacts BP2 which are located in the train power drive circuit (not shown) so that training load may not be applied while the train motor is starting. A pilot light LT is provided on the control panel to indicate operation of the train motor 613.

In Fig. 25 is illustrated the elevation motor controller circuit and, as there shown, current from the main lines 600, 601 and 602 passes through a manual switch PS, the main controller contacts C and the coils 598 (OR—OR) of an overload relay to the elevation drive motor 620. In this circuit current from main line 601 is conducted through main controller operating coil 620a and line 621, through contacts BQ1 and line 622 to pushbutton start switch BX and by line 623 to stop switch BY and thence through line 624 to switch BS1 located above-deck and operable to stop the elevation drive motor when the above-deck mount is being worked on, thence through contacts AL which are open whenever the elevation drive mount is set for manual operation, through switch AH which is closed when the elevation stowage pin is moved to the unlatched position, returning by way of line 625 to main line 602.

It will be noted that control handle BQ when moved to the "Start" position opens contacts BQ2 located in the elevation power drive circuit (not shown) so that elevation load may not be applied while the elevation motor 620 is starting. A pilot light LE is connected across the main lines 601 and 602 near the motor to show on the control panel when it is operating.

In Fig. 26 is illustrated a control and interlock circuit which is shown in detail in Figs. 27 to 30, inclusive, together with suitable operation indicating legends. As shown in Fig. 26 the power received from a step down transformer 626, the operation of which is indicated by light L1, is conducted through lines 627 and 628 to a double pole switch B. With switch B closed current may flow from line 627 to lines 629 and 630 and from line 628 to lines 631 and 632.

From line 629 current may pass downwardly through line 633 and either through the contacts of switches AG2 or AF2 so as to illuminate light L2. Switch AG2 is actuated by a suitable latch which holds the guide vertical and is open when the latch is secured. Switch AF2 is located on the carriage and is normally closed but will be opened by movement of the guide when it reaches the vertical load position.

In order to complete a launcher hoist "raise" circuit current may flow from line 629 through switch AA1 (Fig. 2) which is actuated by a bore clear indicator on the guide tube of the launcher and is closed only when the guide tube is empty, to manually operable switch BA1 operated by control handle BA located on the launcher control panel (Fig. 22) and which is of the three position type to control switches BA1 to BA13 inclusive. This handle BA is shown in its off position. It is movable to the left to close the contacts of all even numbered switches during "Load" operations and is movable to the right to close the contacts of all odd numbered switches for automatic "Run" operations. With switch BA1 closed current may then flow through line 635 to the contacts of stall loaded indicator switch BE1 which are closed when a missile is properly positioned in the ready service magazine stall and is indexed into alignment with the launcher hoist. Switch AG1 is actuated by the launcher tube vertical load position latch and is closed when the guide tube is vertical and the latch pin is in place so as to lock the guide tube during operation of the launcher hoist. The current may then pass through the contacts of switch AF1 which is located on the carriage and is closed when the launcher guide tube is vertical and ready for loading. Thereafter the current may pass through the contacts of switch BR (Fig. 17) which is mounted near the launcher hoist operating cylinder and are closed when the operating cylinder detent is withdrawn so that the hoist may operate. The current then may pass through the contacts of switch BF1 which is closed when the ready service magazine drum is locked against rotation and thence through solenoid SBA to energize the same to operate the pilot valve 441 (Fig. 16) in the hoist control valve block thereby setting the valve to start the hoist to raise. An indicator light L8 on the launcher control panel may simultaneously be illuminated to indicate that the hoist is raising.

It will be noted that unless the contacts of switch BE1 (Fig. 1) are closed, which occurs only when a missile is properly positioned in the ready service ring at the launcher hoist station, there can be no current through the above-described circuit in order to raise the launcher hoist. However, in order to test the launcher hoist without a missile at hoist position, there is provided a by-pass "test" circuit including lines 636, 637 and 638 which is controlled by manually operable switch BM on the control panel, Fig. 22. The control handle of this switch may momentarily be moved from its spring biased normal "Open" position to a "Test Hoist" position to close the contacts BM1 and thus complete the circuit even though no missile occupies the stall at hoist position.

The launcher hoist "raise" circuit may also be operated by current passing through line 639, contacts BA2 which are engaged when control handle BA is turned to "Load," line 640 and contacts BB1 of manual hoist direction control switch BB. However, if a missile is presented to the lower end of the hoist by the ready service magazine and is ready to be raised into the tube, then switch BE2 in this circuit is opened and operation of the hoist cannot be effected. This prevents accidental raising of the hoist when a missile is in the ready service magazine at the hoist position during manual hoist operations.

Continuing to the right of the circuit just described there is provided a launcher hoist "lower" circuit including lead 641 connected to the contacts of switch BG1 (Fig. 2) located on the hoist gear housing and which is actuated by a cam on the launcher hoist chain when the lifter member reaches substantially the top end of its stroke in raising a missile into the guide tube. From this switch lines lead in parallel to contacts BA3 and BA4 operated by control handle BA which is the "Manual Loading Selector" switch. With the control handle BA in "Run" position current will pass from line 641 through contacts BA3 to switch BM2 which is normally closed except when the control handle BM is turned to the "Test Hoist" position in which case the lowering circuit is broken. From switch BM2 the current may pass through the contacts of either switch AB or switch AC, connected in parallel, both of which are located at the rear end of the guide tube, one on top and the other on the underside and each of which is closed when a suitable missile support latch respective thereto is in missile supporting position. From either of these switches the current may pass through line 642 to solenoid SBB mounted on the hoist control block and serving to shift pilot valve 441

(Fig. 16) to initiate hydraulic lowering of the launcher hoist. A suitable indicating light L9 positioned on the hoist control panel is simultaneously illuminated.

If the switch BA is moved to "Load" position, which may be done, for example, when lowering an unfired missile from the guide back into the ready service magazine, then the contacts of switch BA3 are opened and the contacts of switch BA4 are closed and current may flow from line 629 through line 641, switch BG1 and the contacts of switch BA4 to the contacts of switches AD and AE which are located adjacent switches AB and AC, respectively, switches AD and AE being connected in series and closed only when the respective missile support latches, afore-mentioned have been fully retracted. Thence, current may flow through line 643 to switch BB2 operated by control handle BB on the control panel. The contacts BB2 are closed when the handle is moved to the "Lower" position and current is then conducted through line 644 and line 642 to energize solenoid SBB as aforesaid. This permits manual control of the lowering of the launcher hoist, and in addition to illuminating light L9, also illuminates light L5 to indicate that the guide latches are retracted.

Figure 16:
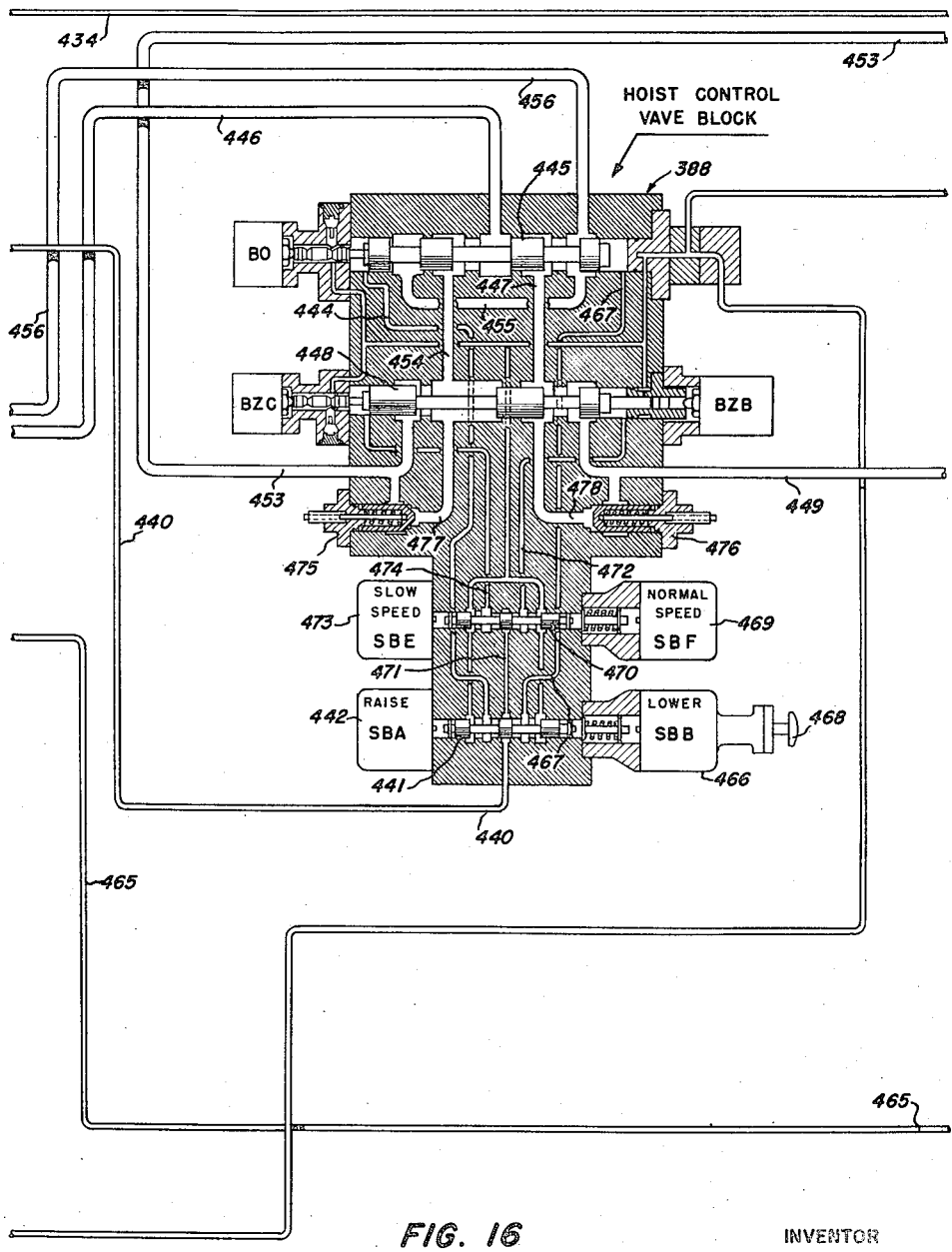
Figure 17:
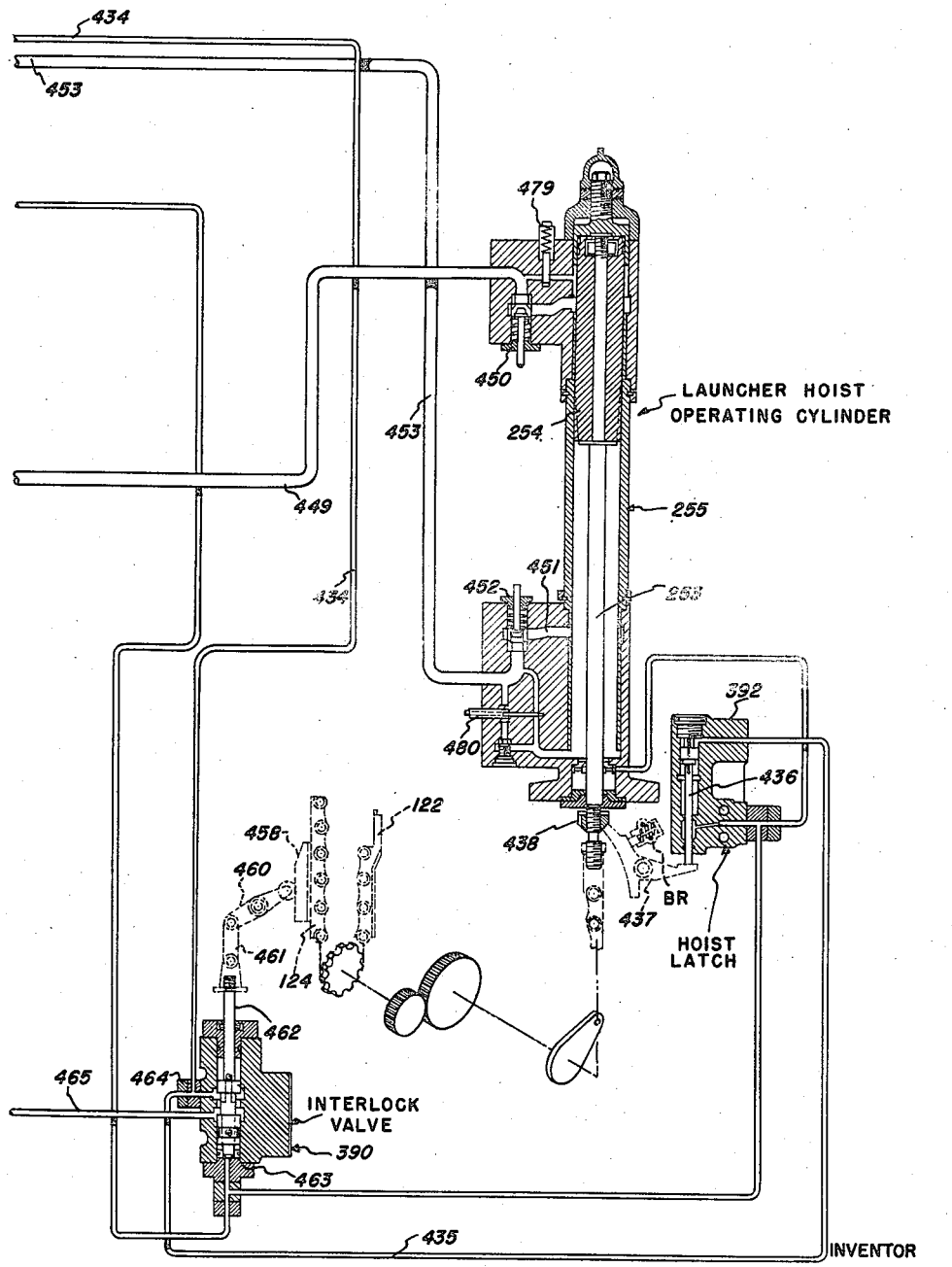
Figure 18:
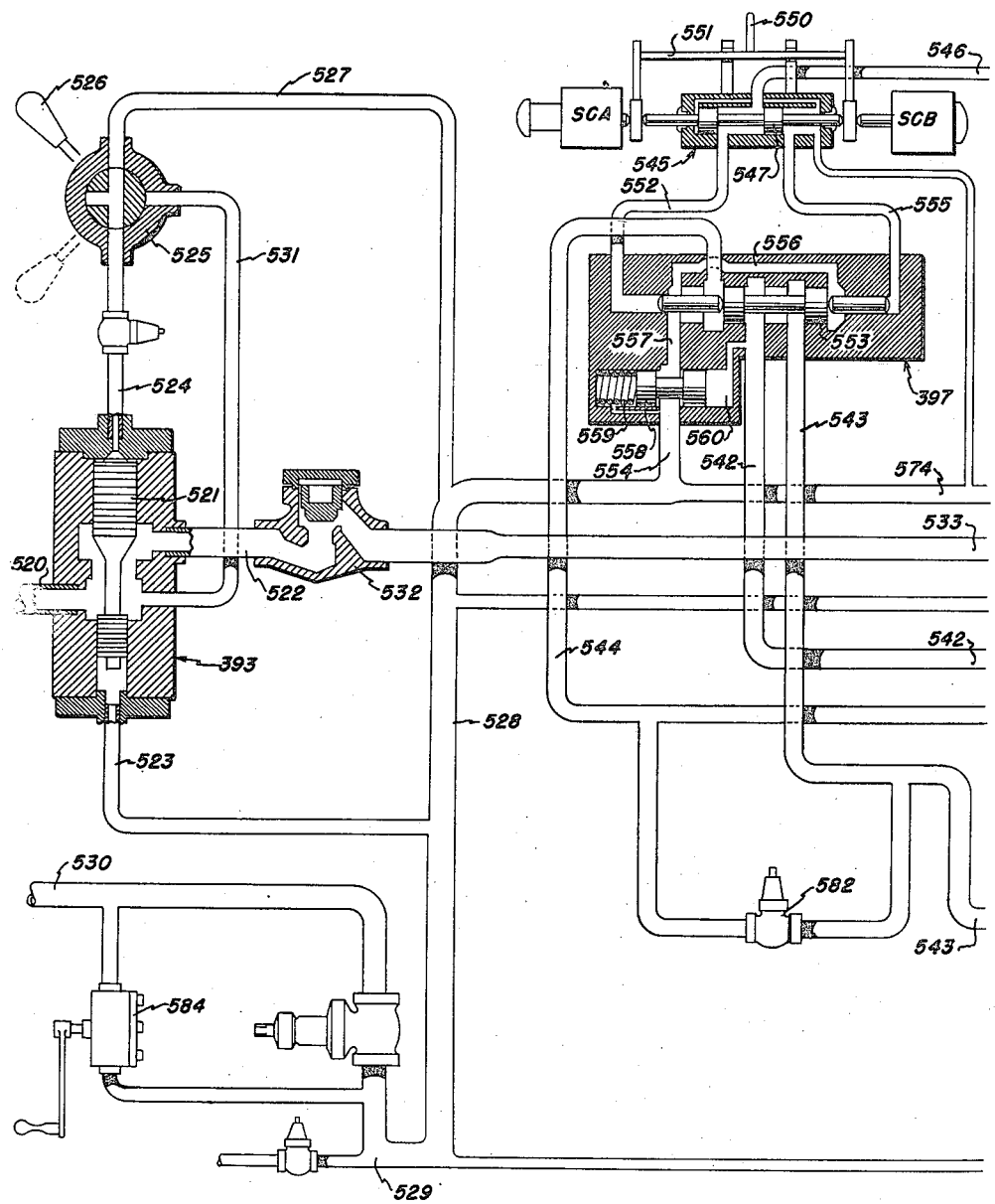

Continuing the discussion, the next circuit to consider is the "hoist speed control" circuit which provides means for shifting valve 470 Fig. 16 for either normal rapid speed hydraulic operation or slow speed hydraulic operation. As shown, current may be conducted from line 629 to switch BH2 which is closed only when the launcher hoist lifter member is at its fully down position, and thence current may flow either through switch BA7 or BA8, depending upon whether the control handle BA is at its right "Run" position or its left "Load" position. With handle BA in its "Run" position current flows through the contacts BA7 to line 645 to contacts of switch BZC (Fig. 16) which is mounted on the hoist control valve block and these contacts are closed only when the pilot valve is positioned for slow speed hoist operation. Thus, if the valve is set for slow speed when the circuit is energized, current will pass through the contacts of this switch to solenoid SBF to shift the pilot valve back to the position for normal rapid speed position.

With the control handle BA in its "Load" position switch BA7 is opened and current from contacts BH2 may pass through contacts BA8 and hence through line 646 to the contacts of switch BZB which is mounted on the hoist control block (Fig. 16) and is closed only when the hoist speed control pilot valve is in its "normal speed" position. From this switch current may flow through solenoid SBE to line 631 to move the afore-mentioned pilot valve for slow speed operation in the event it is in the opposite position when the circuit is energized. When control handle BA is moved to the "Load" position to close the contacts of switch BA4 current will also pass through line 647 to line 646 to energize solenoid SBE and shift the speed control pilot valve for "slow speed" operation.

The next circuit to consider is the "elevation limit stop setting" circuit including line 648 which leads to contacts of switch AA3 (Fig. 2) operated by the bore clear indicator shoe, afore-mentioned, which contacts are open when a missile is in the launcher tube. When the tube is empty these contacts are closed and current may flow to a solenoid SAD which establishes a 90° elevation limit stop for the guide tube. The parallel circuit including switch AA4 has contacts which are closed only when a missile is within the guide tube, hence establishing a second circuit through solenoid SAE which conditions the elevation limit stop setting for a 60° maximum elevation. These two switches and their solenoids thus permit the guide tube return to vertical when it is empty so that it may be reloaded, but prevent the guide tube's automatic return to vertical as long as a missile is within the guide tube.

In order to prevent unintended operation of the launcher while repairs or adjustments are being made on the above-deck components, there is provided an emergency stop circuit the indicator portion of which includes line 649 extending in parallel to lights L6 and L7 (Fig. 22) through switches BS3 and BS4, respectively. Control handle BS is ordinarily located on a small control panel mounted above-deck and close to the above-deck mount, and when operated to close contacts BS3, light L6 on the launcher control panel below deck is illuminated to indicate that the train and elevation motors "Can Start." Conversely when the contacts BS4 of this switch are closed light L7 on said control panel lights to show that the train and elevation motors "Cannot Start." The control portion of this circuit is provided by mechanical linking of the control handle of switch BS with switches BS1 and BS2 in the elevation and train motor controller circuits, respectively (Figs. 24 and 25). As there shown opening of switches BS1 and BS2 breaks the circuit to the operating coil of the main motor controllers and prevents closing of the main line switches.

The next circuit to consider determines which director signal will control movement of the launcher guide. It will be apparent that with a missile in the guide tube it is desired that the tube follow the ship's fire control director signal, while after the missile has left the tube it is desired that the tube return to vertical where it may be loaded with another missile. To this end current from line 629 may pass through lead 650 to switch BG2 which is mounted upon the launcher hoist (Fig. 2) and is opened by a cam on the rammer chain when the hoist lifter member arrives within a short distance of the upper limit of its travel. Since it is necessary for the lifter to enter into the after end of the guide tube to deposit a missile on the missile support latches this interlock switch BG2 prevents movement of the guide tube when the launcher hoist lifter is in a position to interfere with movement of said guide tube.

From switch BG2 current may pass through line 651 to bore clear indicator shoe switch AA2 (Fig. 2) which is closed when a missile is in place in the tube and thereafter the current may pass through switch BA9 which is closed when the manual loading selector control handle BA is in the "Run" position. Thence the current may pass through switch BO which is mounted on the hoist control valve block 388 (Fig. 16) and is closed when the valve parts are set for hoist lowering operation. The current then energizes solenoid SAC (Fig. 2) which my suitable means (not shown) may cause withdrawal of a guide latch which latches the guide in its vertical loading position and simultaneously rotate a switch AN, to switch the elevation drive to ship's director signal so that the guide tube will follow the ship's director in elevation. One method of accomplishing this is to have solenoid SAC control the positioning of a directional hydraulic valve to port oil under pressure against a piston which upon movement retracts the guide latch and simultaneously through a sector arrangement rotates the multi-contact switch AN. Certain of the AN switch contacts may be employed to automatically retract the forward missile restraining latch when the guide latch is retracted as above. At the same time current passes through light L4 on the control panel to indicate that the launcher guide is loaded. Switches AA2 and BA9 may be by-passed by a manually operable switch BZ connected in parallel therewith and mounted above-deck adjacent the above-deck launcher components so that when the switch BZ is closed the guide tube may be operated on director signal for test purposes even though the guide tube is not loaded as above-described.

As related to the operation of the launcher guide tube and the launcher hoist with their interlock and control systems the following discussion will describe the electrical circuits for controlling the ready service magazine rotation, the operation of the stowage hoist and the operation of the stowage hoist tray together with their various interlocks. It will be apparent, of course, that the launcher hoist does not operate while the stowage hoist is being used.

The ready service magazine control circuit includes contacts CA1 (Fig. 9) which receive current from line 629 and are located on the stowage hoist and closed only when the stowage hoist rammer is at its extreme down position. Current then flows to the contacts CB1 located on the tray latch for the stowage hoist (Fig. 9) and which are closed only when the tray is completely latched in the fully up position. Next the current flows through contacts BH1 (Fig. 1) mounted on the launcher hoist housing which are closed only when the launcher hoist is at its fully down position. The current may then pass through contacts BM3 which are controlled by the position of control handle BM (Fig. 22) and these contacts are normally closed except during hoist testing. Thence, the current passes through contacts BB3 which are closed when the control handle is in the "Normal" position. Thereafter current flows through line 652 to contacts BA5 which are closed when the manual loading selector control handle is set to the "Run" position. The current then flows to contacts BE3 (Fig. 1) located within the ready service ring and closed when an empty stall is presented to the launcher hoist. Thereafter the current flows through contacts BC2 which are part of the ring direction selector switch and are closed when the control handle BC (Fig. 22) is turned to the "Run" (CW) position. This permits current to pass to solenoid SBC (Fig. 15) which shifts the direction control pilot valve 481 (Fig. 15) for the ready service magazine drive unit to cause the ready service drum to rotate in a clockwise direction during automatic operation of the launcher.

From contacts BB3 current may flow through line 653 to contacts CD4 which are located on the stowage hoist tray and are closed when no missile is positioned on the tray, thence to contacts BA6 which are closed when control handle BA is set for "Load." The circuit is thereby completed to light L12 to indicate that the ready service magazine "Can Rotate." Thereafter control handle BN may momentarily be closed, shifted to close contacts and cause counterclockwise rotation of the ready service magazine. From the latter contacts current passes through contacts BC1 when the control handle BC on the launcher control panel is set at "Load," and thence to solenoid SBD (Fig. 15) which when energized shifts the direction control pilot valve 481 of the ready service magazine drive unit in order to cause the ready service drum to rotate in a counterclockwise direction.

Contacts CD4 may be by-passed through contacts BD5 which are closed only when control handle BD is in the "Off" position. However, since switch contacts CD4 are open when a missile is on the tray, the ready service magazine cannot rotate if either control handle BD is not at the "Off" position or if there is a missile on the stowage tray during ready service magazine loading operations. When either circuit for the rotation of the ready service magazine is energized, light L10 will be illuminated.

The next circuit to consider includes contacts CB3 (Fig. 9) which are closed only when the stowage tray is not latched and permits current to flow from line 629 to line 654 and through light L3 on the control panel which indicates that the tray is not latched. Through a parallel circuit light LC2 at the stowage hoist operator's control panel may be illuminated when control handle BA is at the run position. Light LC2 advises the tray operator to close the tray immediately.

The electrical circuit for lowering the stowage hoist tray extends through contacts BA10 which are closed when control handle BA is turned to "Load" position, through the contacts BF2 (Fig. 15) which are closed when the ready service magazine latch is in latched position, and through contacts BJ3 (Fig. 2) which are closed when an empty ready service magazine stall is positioned above the stowage hoist. Thence, the circuit continues through line 657 to contacts CA3 (Fig. 9) on the stowage hoist trunk and which are closed when the stowage hoist rammer is at the fully down position. Thereafter current flows through the contacts CL on the stowage tray and which are closed when the tray is in up position, thence through contacts of switch CF (Fig. 9) which is on the tray latch and is closed only when the tray latch is fully retracted and through relay coil RCD closing contacts CRCD to energize solenoid SCD which shifts the hydraulic pilot valve 565 (Fig. 19) to start the tray downwardly. Light L11 shows that the tray can be unlatched while light LC3 on the Stowage Hoist Operator's control board indicates that the loading tray can be lowered.

The next circuit to be considered controls the raising of the stowage hoist tray and includes line 658, contacts CD3 which are closed when a missile is correctly positioned on the tray, line 659 to contacts CM which are closed when the tray is in down position and thence to manually operable pushbutton CE located in the stowage hoist room. When the pushbutton is pressed current flows through relay RCC to close contacts CRCC and energize solenoid SCC (Fig. 19) to shift valve and thereby condition the hydraulic circuit to raise the tray to its vertical position. An indicating light L13 (Fig. 22) shows that the solenoid SCC has been energized to condition the tray operating circuit to raise the tray.

The raise tray circuit may also be energized through contacts BA13 and lines 660, 660a which shunt the contacts of switch CD3 which are open when no missile is on the tray. Contacts BA13 are closed when control handle BA is in the "Run" position. A second shunt circuit includes lines 661 and 660a to permit current to pass through contacts BD6 operated by control handle BD located on the control panel and contacts are closed when the handle is in the "Hoist Amm" position. With control handle BA in the "Load" position, contacts BA10 will be closed permitting current to flow through lines 662 and 663 to pushbutton CZ which is located within or adjacent to the ready service magazine, and when depressed, serves to illuminate light L16 on the control panel to serve as a manual signal to the Mount Operator during loading operations.

Line 662 also connects to line 664 leading to contacts BD3 and BD4 which are in parallel and are actuated by control handle BD. Movement of control handle BD to the "Hoist Amm" position closes contacts BD3 to permit current to illuminate light LC5 at the Stowage Hoist Operator's station to indicate that the ready service drum is being loaded. Current then flows through switch BK (Fig. 2) which is closed when the missile support latch in the stall at the stowage hoist position is in normal position. From there current may pass through the contacts CC1 located on the magazine hoist trunk and which are closed when the stowage hoist is at its fully up position. This permits current to flow to relay RCB, thus closing contacts CRCB to energize solenoid SCB which in turn operates the pilot valve 547 (Fig. 18) to start the stowage hoist rammer downwardly. At the same time light L15 on the control panel (Fig. 22) is illuminated to indicate that the stowage hoist is energized for downward movement.

Through a parallel circuit current may pass from line 664 through line 665 to contacts BD4 which are closed when the control handle BD is in the "Lower Amm" position. Current is then conducted through contacts BL which are so actuated as to be closed when the missile support latch on the ready service magazine stall at stowage hoist position is fully retracted. Thereafter current may flow through contacts CC1 to relay RCB to cause the stowage hoist rammer to lower.

In addition, current may flow from the contacts of switch BD4 through a line 666 to contacts CC2 (Fig. 9)

which are closed when the stowage hoist is fully raised and then through pushbutton CH which may be closed to operate relay RCE which in turn controls contacts CRCE to energize solenoid SCE (Fig. 9) which retracts the missile support latch on the ready service drum at the stowage hoist station. From switch CC2 current may pass through line 667a to illuminate light LC7 (Fig. 11) and show that the missile support latch 266 can be retracted.

At the same time current passing through line 667 illuminates light LC6 at the stowage hoist control panel to indicate that striking down operations are in progress, whereby missiles are being lowered from the ready service drum through the stowage hoist to the stowage magazine.

Simultaneously current may flow from line 666 through contacts CA4 (Fig. 9) which are closed unless the stowage hoist is fully down and through contacts CRCE2 which are closed when latch retracting relay RCE is energized.

From contacts of switch BF2 (Fig. 15) current may flow through line 668 to switches BJ1 and BJ2 (Fig. 2) connected in parallel. Switch BJ1 is closed if the ready service magazine stall at the stowage hoist is empty and permits current to pass through to contacts BD1 which are closed unless control handle BD is at the "Hoist Amm" position used when hoisting missiles from the stowage hoist to the ready service magazine. Current then passes to contacts of switch CD1, located on the stowage hoist loading tray which are closed when a missile is correctly positioned on the tray, and through line 669 to switch contacts CA2 (Fig. 9) on the magazine hoist trunk which are closed when the hoist rammer is fully down. Thence current may pass through switch CB2 on the loading tray latch, closed when the loading tray is latched in the up position, to energize relay RCA, thus closing the contacts of switch CRCA to energize solenoid SCA (Fig. 18) which shifts pilot valve 547 to condition the hydraulic circuit to raise the stowage hoist rammer. Light L14 on the launcher control panel connected in this circuit is illuminated when the solenoid SCA is energized.

A second portion of the stowage hoist control circuit in parallel with a portion of the above circuit includes contacts BJ2 (Fig. 2) which are connected to line 668 and are closed when the missile stall at stowage hoist position is loaded. Current may then be conducted to contacts BD2 which are closed when control handle BD is at "Lower Amm" position, thence to contacts CD2 on the stowage hoist tray which are closed when no missile rests upon the tray. Next the current may pass through pushbutton CG located at the striking down station which when closed, completes the circuit through switch contacts CA2 and CB2 (Fig. 9) to energize solenoid SCA as aforesaid. In addition to indicating light L14 on the light LC4 is illuminated when this circuit is energized to indicate to personnel at the striking down station that the rammer can be raised.

*The firing circuit and firing interlock means*

In Fig. 31 is illustrated a block diagram of a firing circuit which may be used with the launcher of the present invention and includes a control panel 670 from which the firing circuit may be controlled by the Mount Operator, either by a local control pushbutton FBB which is effective when a selector control handle FBC is moved to local position or, if desired, the firing circuit may automatically be controlled by moving the control handle FBC to the "Director" position. In either case the firing impulse leaving the fire control panel along path 671 must pass through the contacts of relays FAE and FAG, which are controlled as hereinafter discussed, to an interlock switch FAB which is closed in any manner found suitable for the purpose only when the guide tube is at less than 60° elevation, then through another switch FAC which is closed, for example, only when the blast chamber exhaust door is open, then through another switch FAD which is closed, for example, only when the missile restraining latches, which might be employed for preventing movement of the missile within the tube, been fully retracted, and finally through a switch FAA which is closed, for example, only when the launcher guide tube is not pointing towards a danger zone, such as part of the ship's own superstructure.

Thereafter firing circuit current is led to the firing pin to be applied to the missile through a missile shroud encircling contact ring, if so desired. The grounded portion of the missile thereupon connects back to the control panel to complete the circuit through path 672.

The synchronism firing interlock including relay operated switches FAE and FAG receives an elevation error signal from the launcher elevation power amplifier and a train error signal from the launcher train power amplifier, these signals are fed into the synchronizing firing interlock which has for each signal a rectifier and a thyratron tube, the grid current of which is varied by changes in the error of the signals and serves to control separate train and elevation relay circuits which close the contacts of switches FAE and FAG as aforesaid when the mount and guide tube are operating in synchronism with the ship's fire control director.

On the firing panel, in addition to the selector control handle FBC and the local fire control pushbutton FBB, there is provided a safety plug FBA which is intended to be removed and carried about by personnel when making adjustments on the mount.

The panel also has control lights such as LF1 which indicates when the 115 volt firing circuit from the director is energized; LF2 which indicates when 115 volts is being supplied to the synchronized firing interlock; LF3 which indicates when the firing circuit is completed and LF4 which is a "Cease Fire" signal for advising the Mount Operator that the firing should stop.

*Operation*

In the above description has been set forth the structures and functions of the hydraulic and electrical power and control system and interlock circuits therefor in accordance with the present invention. The following discussion is concerned with the operation of the launcher during loading of the stowage magazine, automatic fire, reloading of the ready service magazine from the stowage magazine, and testing and casualty operations such as would be encountered by actual use of a launcher embodying the present electric-hydraulic power and control system. For this purpose, it will be assumed to start with that the launcher mount is in stowed condition, that all control and power circuits are off and that both ready service and stowage magazines are empty.

As before-mentioned only a minimum number of personnel is necessary in order to carry out the above operations with the present invention. These personnel are located at suitable control panels and there is illustrated in Fig. 11 one arrangement and location of such panels and operation stations which may be employed. As there shown a "Mount Operator," a "Stowage Hoist Operator" and a "Striking Down Controlman" are located below decks.

*Striking down operations.*—There will first be considered the operation of the electric-hydraulic system during lowering of missiles into the ready service magazine and thereafter lowering of missiles from the ready service magazine into the ship's stowage magazine. This loading operation is commonly referred to as a "Striking Down" operation.

Before any missiles are lowered into an empty stall of the ready service magazine drum, as a safety precaution, personnel topside first ascertain that the (BS), conveniently located above-deck (Fig. 11), as on the pedestal of the crane, is turned to "Off." This prevents starting of the train and elevation motors during the striking down stowage operation. The Mount Operator then closes the hoist motor controller circuit breaker CB, which illuminates light L1 on the launcher control panel. Next he turns the control handle B to "On," thereby energizing the control and interlock circuits. The Mount Operator then presses the "Start" pushbutton BT on the control panel, starting the hoist motor and illuminating light LH; turns control handle BA to "Load"; turns control handle BC to "Load"; and turns control handle BD to "Lower Amm." The ready service drum is now in condition to be loaded, and a missile may be lowered from above through a striking down hatch into an empty stall directly beneath this hatch. When the shroud at the lower end of the missile rests on the missile support latch in the lower end of the stall, the crane cable is unhooked and the Striking Down Controlman signals the Mount Operator who then turns control handle BN momentarily to "Rotate," thus indexing the ready service magazine one position and placing the next empty stall directly beneath the striking down hatch. This procedure is repeated until the desired number of missiles are in the ready service magazine stalls. The number of missiles lowered into the ready service magazine will depend on the method of loading, as explained above. A manual signal switch CZ at the striking down station enables the Striking Down Controlman to signal the Mount Operator by flashing light L16 on the control panel. The Mount Operator therefore, is notified when to rotate the ring by prearranged signals from the striking down station. The next step in the striking down operation involves lowering missiles from the ready service drum to the ship's stowage magazine. To do this the Mount Operator first ascertains that the control panel light, L3 is not lighted. If this indicator is lighted, showing, "Not Latched," operations cannot be carried on. (As the hoist tray acts as a flame seal, a missile should never be in position above the magazine hoist unless the tray is raised and latched; consequently, the interlock circuit is so arranged that the ready service magazine cannot be rotated until the latter condition exists.) The Stowage Hoist Operator observes that light LC1 and light LC6 are illuminated indicating that power is on and that striking down operations are in progress.

During the lowering of missiles into the ready service magazine the Mount Operator watches the signal light L11 which will go on (displaying "Empty") each time the ring is latched, so long as empty stalls are presented to the magazine hoist. When the first loaded stall arrives over the magazine hoist, light L11 will stay out when the ring latches. This advises the Mount Operator to discontinue indexing operations.

Thereafter pushbutton CG is depressed by the Striking Down Controlman to raise the stowage hoist. At the top of its stroke, the hoist lifts the missile above the missile support latch at the bottom of the magazine stall and stops. Pushbutton CH may then be operated, by the Striking Down Operator to withdraw the missile support latch. Withdrawal of this latch closes switch BL in the interlock circuit and the stowage hoist automatically starts downwardly, lowering the missile to the vertically positioned tray at the bottom of the hoist. The start of the up and the down travels of the stowage hoist are indicated to the Mount Operator by lights L13 and L15, respectively, on the control panel.

When the stowage hoist with a missile reaches the bottom of its stroke, light LC3 illuminates, indicating that the tray may be lowered. The Stowage Hoist Operator then lowers the tray and missile to a horizontal position. The exposed missile may thereafter be removed from the tray by stowage room personnel and transported to suitable stowage racks.

After the missile has been removed from the tray, the Stowage Hoist Operator presses pushbutton CE to start the tray up. When the tray pivots to the vertical position it automatically latches and the light L3 goes out to indicate that the tray is now latched. Thereafter the Mount Operator moves control handle BN momentarily to rotate the ready service magazine one position, and so place the next loaded stall over the magazine hoist. The missile lowering operation is then repeated. Indexing of the ready service magazine also places an empty stall under the striking down hatch, and if desired another missile may be lowered into the empty stall by the whip hoist. Through the use of signals from the Striking Down Controlman to the Mount Operator, as provided by the present system, the action of personnel at both of these stations can be coordinated to load missiles into the stowage magazine from topside as a continuous operation.

*Loading ready service magazine from below.*—The ready service magazine may be loaded from below where it is desired to prepare the launcher for a state of readiness for action. In order to accomplish this the Mount Operator first starts the hoist motor and conditions the control circuits as aforesaid. He then turns control handle BA to "Load"; turns control handle BC to "Load"; and moves control handle BD to "Hoist Amm." The Stowage Hoist Operator then observes that lights LC1, LC3 and LC5 are illuminated and causes the tray to lower to a horizontal position.

When a missile has been correctly positioned on the tray, the Stowage Hoist Operator presses pushbutton CE, thereby raising the tray and missile to the vertical position whereupon the stowage hoist automatically raises the missile into the empty ready service magazine stall directly above the hoist, raising the missile high enough to clear a missile support latch which snaps back to its normally extended position under the missile. The stowage hoist then reverses direction and starts downwardly, but the missile is retained in the ready service magazine stall by the missile support latch. When the stowage hoist reaches the bottom of its stroke, one loading cycle will have been completed and the ready service magazine can be indexed by the Mount Operator to permit the next stall to be loaded in similar position. This is continued until the ready service magazine is filled.

The Mount Operator follows the action of the magazine hoist and tray by observing the lights on the control panel. These lights indicate the start of travel of the magazine hoist "Up" (L14) or "Down" (L15), and the condition of the hoist tray "Up" (L13) or "Not Latched" (L3). In addition, light L12, displaying the words "Can Rotate," notifies the Mount Operator when conditions are such that the ready service magazine can be rotated in manual control. This condition occurs when the magazine hoist rammer is fully down, the magazine hoist tray is latched in up position, either no missile is on the magazine hoist tray or switch BD is at the "Off" position, the launcher missile hoist is fully down and switch BA is at the "Load" position.

*Launcher hoist test.*—It is desirable from time to time to raise and lower the launcher hoist without a missile so as to test the operation of the hoist and be sure that it is in proper operating condition. This may be done only when the guide tube is in vertical position and the hoist motor has not been started as described above. When so conditioned the Mount Operator moves control handle BM to the "Test Hoist" position which will cause the empty hoist to rise at normal speed to the upper limit of its travel and when the control handle BM is released the hoist will return automatically at normal speed to its lower position.

*Automatic firing run operation.*—When the ready service magazine is loaded and the entire launcher is prepared for operation, the Mount Operator may set up his control panel (Fig. 22) for automatic firing operation as follows: the hoist, train and elevation motors are started by pushbuttons BT, BV and BX, respectively; thereafter control handle B is moved to "On" position; control handle BA is moved to "Run" position and control handle BC is moved to "Run" (CW) position. The remaining handles are left in their indicated positions. At the same time switch FBC on the fire control panel is moved to "Director" position and the Safety Plug FBA must be in place.

Immediately the guide tube, if horizontal, will pivot to vertical "Load" position and a missile will be hoisted from the ready service magazine up into the guide tube which will then move downwardly beyond 60° elevation, whereafter it operates in response to signals received from the ship's fire director system and will follow the ship's director until the firing circuit is closed to launch the missile from the guide tube, whereafter the tube will pivot upwardly to receive another missile. This loading and firing cycle will continue until all of the missiles in the ready service magazine have been fired in rapid succession without any further action on the part of launcher personnel, or until the firing circuit is left open. When the ready service magazine becomes empty it will continue to rotate intermittently until stopped by the Mount Operator turning the control handle BA to "Off" position. Such automatic operation is schematically indicated in Figs. 3 to 8, inclusive, and the Time Cycle of Operation of Fig. 10.

In the event the automatic "Run" operation is stopped with an unfired missile in the guide tube this missile may be returned to the ready service magazine as follows: the Mount Operator turns switch BA to "Off," the train and elevation power drives are stopped by pushbuttons BW and BY or by moving switch BS topside to "Off," the train and elevation drives at the mount are shifted from automatic to manual operation, the guide tube is elevated manually to its vertical position and the mount is trained manually to a position where the hoist lifter 122 will not strike the missile support latches. The control handles or switches BA and BC are then turned to "Load," the control handle of switch BN is operated momentarily to rotate the ready service drum one stall counterclockwise, switch BB is turned momentarily to "Hoist" to raise the hoist lifter 122 so as to engage the bottom of the missile to raise the missile off of the missile support latches whereupon the missile support latches 135 may be manually retracted by any suitable means, as by a lever, for example. Switch BB is then momentarily turned to "Lower" to cause the hoist lifter with the missile to descend and return the latter to the empty ready service magazine stall.

*Casualty operation procedures.*—In the event a missile in the guide tube fails to fire then the missile cannot be returned to the ready service magazine but must be jettisoned over the side of the ship. This operation is controlled by the Mount Operator who first turns control handle BA to the "Off" position, stops the train motor, elevation motor and hoist motor and turns off the control and firing circuits. Thereafter the above-deck crew can safely cool the external sprinkler connection of line 191 and the sprinkler system is operated for several minutes or until the guide tube and undertake operations to manually jettison the missile over the side of the ship.

It should be understood that the mechanical concepts of the launching system disclosed herein form no part of the electric-hydraulic power and control system of the present invention and that such disclosure to the launching system is made only for the purpose of illustrating the manner in which the present invention may be employed. It will be readily apparent, however, that the present invention may be advantageously employed in numerous other installations, if so desired.

Similarly, the reference made to the physical location of the various switches, solenoids, and hydraulic cylinders are for the purpose of illustration only and, in other installations, might be located in a different fashion without altering the basic structure and operating characteristics of the present system.

Obviously many modifications and variations of the present invention are possible in the light of the above teachings. It is therefore to be understood that within the scope of the appended claims the invention may be practiced otherwise than as specifically described.

What is claimed is:

1. An electric and hydraulic power and control system for controlling the hoisting and loading of elongated objects from a horizontal position on a loading tray at a stowage area to a vertical position in a movable storage structure above the stowage area and thence from the movable storage structure to a vertical position at an unloading station above the storage structure and vice versa and comprising an accumulator for storing hydraulic fluid under pressure, hydraulic driving means for effecting step-by-step movement of said storage structure, a hoist operating piston and cylinder for effecting movement of objects from the storage structure to the station thereabove and vice versa, a hydraulic motor for moving objects from the storage structure to a station therebelow and vice versa, a hydraulic tray operating cylinder for effecting arcuate movement in a vertical plane of a horizontally disposed object in transfer at the stowage area below the storage structure, said hydraulic driving means, hoist operating cylinder, hydraulic motor, and hydraulic tray operating cylinder all being hydraulically connected to said accumulator, and hydraulic control and interlock valves hydraulically connected between the accumulator and said hydraulic driving means, hoist cylinder, motor and tray cylinder for providing sequential loading and unloading of objects from the storage structure.

2. An electric and hydraulic power and control system for controlling the hoisting and loading of elongated objects from a horizontal position on a loading tray at a stowage area to a vertical position in a movable storage structure above the stowage area and thence from the movable storage structure to a vertical position at an unloading station above the storage structure and vice versa and comprising a source of hydraulic fluid under pressure, driving means for driving said storage structure in step-by-step sequence, a hoist operating piston and cylinder for effecting one-stroke movement of objects from the storage structure to a station thereabove and vice versa, a hydraulic motor for effecting one-stroke movement of objects from the storage structure to a station therebelow and, a hydraulic tray operating cylinder for effecting arcuate movement in a vertical plane of a horizontally disposed object in transfer at the station below the storage structure, said driving means, hoist operating cylinder, hydraulic motor, and hydraulic tray operating cylinder all being hydraulically connected to said source of hydraulic fluid, and interlock means for assuring sequential operation of the system.

3. An electric and hydraulic power and control system for controlling the hoisting and loading of elongated objects from a horizontal position on a loading tray at a stowage area to a vertical position in a movable storage structure above the stowage area and thence from the movable storage structure to a vertical position at an unloading station above the storage structure and vice versa to and from stations above and below the storage structure and comprising a source of hydraulic fluid under pressure, hydraulic driving means for driving said storage structure in step-by-step fashion, a hoist operating piston and cylinder for effecting one-stroke movement of objects from the storage structure to the unloading station thereabove and vice versa, a hydraulic motor for effecting one-stroke movement of objects from the storage structure to the stowage area station therebelow and, a hydraulic tray operating cylinder for effecting arcuate movement of a horizontally disposed object to a vertical position at the stowage area below the storage structure, said driving means, hoist operating cylinder, hydraulic motor, and hydraulic tray operating cylinder all being hydraulically connected to said source of hydraulic fluid, transmission means between said driving means and said storage structure, a valve to control the flow of hydraulic fluid to the driving means, and means in the transmission for shifting said valve upon approach of an object in the storage structure toward a predetermined position adjacent said hoist operating piston and cylinder whereby to decrease the supply of hydraulic fluid to said driving means and thereby reduce the speed of movement of the storage structure.

4. In a conveyor and plural hoist system wherein the conveyor is laterally movable and one hoist is movable between the conveyor and a station thereabove and another hoist is movable between the conveyor and a station therebelow, a power and control system comprising; means for independently effecting lateral movement of the conveyor with respect to the hoists, means for independently effecting movement of each hoist, and interlock means for controlling the operation of the conveyor and each hoist in a predetermined sequence.

5. A power and control system for controlling the hoisting and loading of elongated objects from a horizontal position on a loading tray at a stowage area to a vertical position in a movable storage structure above the stowage area and thence from the movable storage structure to a vertical position at an unloading station above the storage structure and vice versa and comprising means for moving and controlling the movement of the storage structure in a step-by-step fashion, means for moving and controlling the movement of objects from the storage structure to the unloading station thereabove and vice versa, means for moving and controlling the movement of objects from the storage structure to the stowage area therebelow and vice versa, interlock means for effecting operation of said afore-mentioned means in a predetermined sequence.

6. In a storage conveyor and plural hoist system wherein the conveyor is rotatably movable about a vertical axis and one hoist is vertically movable between the conveyor and a station thereabove and another hoist is vertically movable between the conveyor and a station therebelow, a power and control system comprising; means for independently effecting step-by-step rotational movement of the conveyor with respect to both hoists, means for independently effecting continuous movement of each hoist from the bottom to the top of each lift and then reversal of movement from top to bottom of each lift, interlock means for controlling the operation of the conveyor and each hoist in a predetermined sequence, and signal circuits for indicating at a remote control station each stage of sequential operation of the conveyor and hoists.

7. In a storage conveyor and plural hoist system wherein the conveyor is laterally movable relative to the hoists and one hoist is movable between the conveyor and a station thereabove and another hoist is movable between the conveyor and a station therebelow, a power and control system comprising; means for independently effecting step-by-step lateral movement of the conveyor with respect to the hoists, means for independently effecting one-stroke movement of each hoist from the bottom to the top of each lift and vice versa, interlock means for controlling the operation of the conveyor and each hoist in a predetermined sequence, said means for effecting independent movement of the conveyor and hoists including electric control circuits energized from a remote control station, transducer means for converting electrical power into hydraulic power, and hydraulic actuating means connected to said transducer means for effecting the independent movement of the conveyor and hoists.

8. In a conveyor and plural hoist system wherein the conveyor is laterally movable relative to the direction of travel of the hoists and one hoist is movable between the conveyor and a loading and unloading station thereabove and another hoist is movable between the conveyor and a loading and unloading station therebelow, a power and control system comprising; means for independently effecting step-by-step lateral movement of the conveyor with respect to the hoists, said means including electric control circuits energized from a remote control station, transducer means for converting electrical power into hydraulic power, and hydraulic actuating means connected to said transducer means for effecting independent movement of the conveyor and hoists, means for independently effecting one-stroke movement of each hoist from the bottom to the top of the entire hoist travel and vice versa, interlock means for controlling the operation of the conveyor and each hoist in a predetermined sequence, said interlock means including switch devices mechanically connected to the conveyor and hoists for actuation by predetermined movement thereof and electrically connected to switch circuits for maintaining a predetermined sequence of operation of the conveyor and hoists.

9. In a storage conveyor and plural hoist system wherein the conveyor is laterally movable relative to the direction of travel of each hoist and one hoist is movable between the conveyor and a loading and unloading station thereabove and another hoist is movable between the conveyor and a loading and unloading station therebelow, a power and control system comprising; means for independently effecting lateral step-by-step movement of the conveyor with respect to both hoists, said means including control circuits energized from a remote control station, said means further including a transducer for converting electrical power into hydraulic power, and said means further including hydraulic actuating means connected to said transducer for effecting the independent movement of the conveyor and hoists, means for independently effecting one-stroke movement of each hoist between the conveyor and the station individual to the respective hoist, interlock means for controlling the operation of the conveyor and each hoist in a predetermined sequence, said interlock means including switch devices mechanically connected to the conveyor and hoists for actuation by predetermined movement thereof and electrically connected to switch circuits for maintaining a predetermined sequence of operation of the conveyor and hoists, electric signal circuits for indicating at a remote control station each stage of sequential operation of the conveyor and hoists, and means for altering the sequence of operation in response to altering the order in which said control circuits are energized.

10. A power and control system for controlling the loading of vertically disposed, elongated objects into a rotatable storage structure from stations above and below the storage structure and vice versa and comprising means for moving and controlling the rotation of the storage structure about a vertical axis, means for moving and controlling the movement of objects from the storage structure to the station thereabove and vice versa, means for moving and controlling the movement of objects from the storage structure to the station therebelow and vice versa, interlock means for effecting operation of said afore-mentioned means in a predetermined sequence, means at the station above the rotatable storage structure for effecting sequential removal of objects as the latter complete transfer movement from the storage structure to the station thereabove, an actuating circuit to said last-mentioned means for controlling the actuation thereof, and an interlock circuit for enabling said actuating circuit to be energized only when said last-mentioned means has been conditoned in accordance with a predetermined plan.

11. An electric and hydraulic power and control system for controlling the hoisting and loading of elongated objects from a horizontal position on a loading tray at a stowage area to a vertical position in a movable storage structure above the stowage area and thence from the movable storage structure to a vertical position at an unloading station above the storage structure and vice versa and comprising; an accumulator for storing hydraulic fluid under pressure, first, second, and third hydraulic control circuits connected to said accumulator; said first hydraulic circuit including an emergency stop valve, a tray operating hydraulic cylinder and a stowage area hoist operating hydraulic motor connected to said stop valve, said tray operating cylinder being positioned for effecting arcuate movement in the vertical plane of an object placed on the tray, a flow control valve and a tray reversing valve being hydraulically connected in the line between said stop valve and said tray operating cylinder, a second flow control valve, an acceleration control valve and a second reversing valve being connected in the line between said motor and said stop valve, and a hydraulic brake connected to the line between said motor and said second reversing valve whereby the brake is released whenever hydraulic power is supplied to said motor; said second hydraulic control circuit including a hydraulic drive unit for the movable storage structure, and a control valve block for said drive unit connected between the latter and said accumulator; said third hydraulic control circuit including a hoist operating cylinder and piston therefor for effecting movement of the objects from the storage structure to the unloading station, and a hoist control valve connected between said hoist operating cylinder and said accumulator; hydraulic and electric interlock means connected to said hydraulic control circuits for preventing operation thereof except in a predetermined sequence, said electric interlock means including switch devices mechanically connected to the storage structure and hoists for actuation by predetermined movement thereof and electrically connected to switch circuits for maintaining a predetermined sequence of operation of the storage structure and hoists, a plurality of electric control circuits energizable from a remote control station and including said electric interlock means, electric signal circuits for indicating at the remote control station each stage of sequential operation of the storage structure and hoists, and means for altering the sequence of operation in response to altering the order in which said control circuits are energized.

12. An electric and hydraulic power and control system for controlling the hoisting and loading of elongated objects from a horizontal position on a loading tray at a stowage area to a vertical position in a movable storage structure above the stowage area and thence from the movable storage structure to a vertical position at an unloading station above the storage structure and vice versa and comprising; a source of pressurized hydraulic fluid, first, second, and third hydraulic control circuits connected to said source; said first hydraulic circuit including a tray operating hydraulic cylinder and a stowage area hoist operating hydraulic motor, said tray operating cylinder being positioned for effecting arcuate movement in the vertical plane of an object placed on the tray; said second hydraulic circuit including a hydraulic drive unit for effecting step-by-step movement of the storage structure; said third hydraulic circuit including a hoist operating cylinder for effecting one-stroke movement of objects from the storage structure to the unloading station; hydraulic interlock means connected to said hydraulic control circuits for preventing operation thereof except in a predetermined manner and sequence, said hydraulic interlock means including valve means, electric valve actuating means connected to said valve means, and electric interlocks including switch devices mechanically connected to the storage structure and hoists for actuation by predetermined movement thereof, said switch devices being connected in electric circuit to said valve actuating means whereby the hydraulic control circuits may be activated to hoist and load objects in said predetermined sequence.

13. An electric and hydraulic power and control system for controlling the hoisting and loading of elongated objects from a horizontal position on a loading tray at a stowage area to a vertical position in a movable storage structure above the stowage area and thence from the movable storage structure to a vertical position at an unloading station above the storage structure and vice versa and comprising; an accumulator for storing hydraulic fluid under pressure, first, second, and third hydraulic control circuits connected to said accumulator; said first hydraulic circuit including an emergency stop valve, a tray operating hydraulic cylinder and a stowage area hoist operating hydraulic motor connected to said stop valve, said tray operating cylinder being positioned for effecting arcuate movement in the vertical plane of an object placed on the tray, a flow control valve and a tray reversing valve being hydraulically connected in the line between said stop valve and said tray operating cylinder, a second flow control valve, an acceleration control valve and a second reversing valve being connected in the line between said motor and said stop valve, and a hydraulic brake connected to the line between said motor and said second reversing valve whereby the brake is released whenever hydraulic power is supplied to said motor; said second hydraulic control circuit including a hydraulic drive unit for the movable storage structure, and a control valve block for said drive unit connected between the latter and said accumulator; said third hydraulic control circuit including a hoist operating cylinder and piston therefor for effecting movement of the objects from the storage structure to the unloading station, and a hoist control valve connected between said hoist operating cylinder and said accumulator; a latch valve for said storage structure connected between said storage structure control valve block and said hoist control valve block, a hydraulically actuatable brake mechanically connected to said storage structure drive unit and hydraulically connected to the line between said storage structure control valve block and said latch valve for said storage structure, an interlock valve mechanically connected to the piston of said hoist operating cylinder and hydraulically connected between said accumulator and said storage structure control valve block, a hoist latch valve mechanically connected to said hoist operating cylinder and hydraulically connected to said accumulator, electric interlock means including switch devices mechanically connected to the storage structure and hoists for actuation by predetermined movement thereof and electrically connected to switch circuits for maintaining a predetermined sequence of operation of the storage structure and hoists, a plurality of electric control circuits energizable from a remote control station and including said electric interlock means, electric signal circuits for indicating at the remote control station each stage of sequential operation of the storage structure and hoists, and means for altering the sequence of operation in response to altering the order in which said control circuits are energized.

References Cited in the file of this patent

UNITED STATES PATENTS

| | | |
|---|---|---|
| 1,683,937 | White | Sept. 11, 1928 |
| 2,390,302 | Henricksen | June 25, 1946 |
| 2,402,742 | Ellis | June 25, 1946 |
| 2,402,777 | Rose et al. | June 25, 1946 |
| 2,407,692 | Vickers | Sept. 17, 1946 |
| 2,456,620 | Chadwick et al. | Dec. 21, 1948 |
| 2,566,391 | Wertman et al. | Sept. 4, 1951 |
| 2,591,673 | Chadwick et al. | Apr. 8, 1952 |
| 2,671,861 | Bullard | Mar. 9, 1954 |